(12) United States Patent
Tsujimoto

(10) Patent No.: US 8,625,119 B2
(45) Date of Patent: *Jan. 7, 2014

(54) MULTIFUNCTION APPARATUSES EACH OF WHICH CARRIES OUT A COOPERATION PROCESS IN COOPERATION WITH AN APPLICATION WHICH IS EXECUTABLE ON AN EXTERNAL INFORMATION PROCESSING APPARATUS

(75) Inventor: Kunihiko Tsujimoto, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 228 days.

This patent is subject to a terminal disclaimer.

(21) Appl. No.: 13/182,177

(22) Filed: Jul. 13, 2011

(65) Prior Publication Data

US 2012/0013931 A1   Jan. 19, 2012

(30) Foreign Application Priority Data

Jul. 15, 2010   (JP) ................................. 2010-160858

(51) Int. Cl.
G06F 3/12   (2006.01)
G06K 15/00   (2006.01)

(52) U.S. Cl.
USPC ....................................... 358/1.13; 358/1.14

(58) Field of Classification Search
USPC .......... 358/1.1, 1.13, 1.14, 1.15, 1.16; 399/70
See application file for complete search history.

(56) References Cited

U.S. PATENT DOCUMENTS

| 6,937,353 | B2 * | 8/2005 | Iizuka et al. | ................. 358/1.13 |
| 7,814,236 | B2 | 10/2010 | Tsujimoto | |
| 2006/0055962 | A1 * | 3/2006 | Saito | ............................ 358/1.15 |
| 2007/0159663 | A1 | 7/2007 | Tsujimoto | |
| 2010/0036855 | A1 | 2/2010 | Sasaki et al. | |
| 2012/0057183 | A1 * | 3/2012 | Tsujimoto | .................... 358/1.13 |

FOREIGN PATENT DOCUMENTS

| CN | 101646002 A | 2/2010 |
| JP | 2001-201986 A | 7/2001 |
| JP | 2004-222234 A | 8/2004 |
| JP | 2005-297264 A | 10/2005 |

(Continued)

OTHER PUBLICATIONS

Office Action mailed Dec. 4, 2012 in co-pending U.S. Appl. No. 13/224,407.

Primary Examiner — Gabriel Garcia
(74) Attorney, Agent, or Firm — Edwards Wildman Palmer LLP; David G. Conlin; Edmund J. Koundakjian

(57) ABSTRACT

A multifunction apparatus includes an application information storage section in which, for each of a plurality of applications, (i) identification information for identifying the each of the plurality of applications and (ii) function information indicating what function(s) has been previously carried out in a cooperation process carried out by the multifunction apparatus and the application in cooperation with each other, are stored, and a device control section which determines, when the device control section receives an instruction to start a cooperation process, whether or not Condition A is satisfied, the device control section causing, if Condition A is satisfied, a switching operation for switching an image forming section from a waiting mode to a normal operation mode to be started, Condition A: function information associated with identification information indicating the selected application indicates a specific function which causes the image forming section to operate.

16 Claims, 15 Drawing Sheets

(56) References Cited

FOREIGN PATENT DOCUMENTS

| | | |
|---|---|---|
| JP | 2006-099489 | 4/2006 |
| JP | 2006/218810 A | 8/2006 |
| JP | 2006-313452 | 11/2006 |
| JP | 2007-174400 A | 7/2007 |
| JP | 2008-209825 A | 9/2008 |
| JP | 2009-104207 A | 5/2009 |
| JP | 2009-232219 A | 10/2009 |
| JP | 2010-122827 A | 6/2010 |
| JP | 2011-025607 | 2/2011 |

* cited by examiner

FIG. 2

| ID | APPLICATION IDENTIFICATION INFORMATION (APPLICATION NAME) | REGISTRATION ADDRESS | INFORMATION ON USED FUNCTION |
|---|---|---|---|
| 1 | EASY COPY | http://example.com/copy | NONE |
| 2 | DOCUMENT MANAGEMENT | http://example.com/scan | SCANNING |
| ... | ... | ... | ... |
| N | BUSINESS FORM PRINT | http://example.com/print | PRINTING |
| N+1 | GENERAL APPLICATION A | http://example.com/aaa | PRINTING, COPYING |

FIG. 7

| USER ID | COPYING FUNCTION | SCANNING FUNCTION | FAX SENDING /RECEIVING FUNCTION | PRINTING FUNCTION |
|---|---|---|---|---|
| 1 | VALID | VALID | VALID | VALID |
| 2 | INVALID | VALID | VALID | INVALID |
| ... | ... | ... | ... | ... |
| N | VALID | VALID | VALID | VALID |

FIG. 9

| USER ID | COPYING FUNCTION | SCANNING FUNCTION | FAX SENDING /RECEIVING FUNCTION | PRINTING FUNCTION |
|---|---|---|---|---|
| 1 | 154 | 50 | 10 | 0 |
| 2 | 0 | 12 | 5 | 0 |
| ... | ... | ... | ... | ... |
| N | 196 | 75 | 10 | 38 |

FIG. 10

| ID | APPLICATION IDENTIFICATION INFORMATION (APPLICATION NAME) | REGISTRATION ADDRESS | INFORMATION ON USED FUNCTION | APPLICATION START-UP NUMBER | WARM-UP FUNCTION EXECUTION NUMBER |
|---|---|---|---|---|---|
| 1 | EASY COPY | http://example.com/copy | NONE | 0 | 0 |
| 2 | DOCUMENT MANAGEMENT | http://example.com/scan | SCANNING | 30 | 0 |
| ... | ... | ... | ... | ... | ... |
| N | BUSINESS FORM PRINT | http://example.com/print | PRINTING | 50 | 50 |
| N+1 | GENERAL APPLICATION A | http://example.com/aaa | PRINTING, COPYING | 40 | 25 |

FIG. 12

| ID | APPLICATION IDENTIFICATION INFORMATION (APPLICATION NAME) | REGISTRATION ADDRESS | INFORMATION ON USED FUNCTION | START TIMING INFORMATION |
|---|---|---|---|---|
| 1 | EASY COPY | http://example.com/copy | NONE | 5 MINUTES |
| 2 | DOCUMENT MANAGEMENT | http://example.com/scan | SCANNING | — |
| ... | ... | ... | ... | ... |
| N | BUSINESS FORM PRINT | http://example.com/print | PRINTING | 3 MINUTES |

FIG. 14

| ID | APPLICATION IDENTIFICATION INFORMATION (APPLICATION NAME) | REGISTRATION ADDRESS | INFORMATION ON USED FUNCTION | EXECUTION TIME PERIOD INFORMATION |
|---|---|---|---|---|
| 1 | EASY COPY | http://example.com/copy | NONE | — |
| 2 | DOCUMENT MANAGEMENT | http://example.com/scan | SCANNING | — |
| ... | ... | ... | ... | ... |
| N | BUSINESS FORM PRINT | http://example.com/print | PRINTING | 4 MINUTES AND 10 SECONDS |

FIG. 15

| ID | APPLICATION IDENTIFICATION INFORMATION (APPLICATION NAME) | REGISTRATION ADDRESS | INFORMATION ON USED FUNCTION | RETURN DESTINATION MODE |
|---|---|---|---|---|
| 1 | EASY COPY | http://example.com/copy | NONE | NORMAL OPERATION MODE |
| 2 | DOCUMENT MANAGEMENT | http://example.com/scan | SCANNING | |
| ... | ... | ... | ... | ... |
| N | BUSINESS FORM PRINT | http://example.com/print | PRINTING | SECOND ENERGY SAVING MODE |
| N+1 | GENERAL APPLICATION A | http://example.com/aaa | PRINTING, COPYING | FIRST ENERGY SAVING MODE |

FIG. 16

| ID | APPLICATION IDENTIFICATION INFORMATION (APPLICATION NAME) | REGISTRATION ADDRESS | INFORMATION ON USED FUNCTION |
|---|---|---|---|
| 1 | EASY COPY | http://example.com/copy | 0 |
| 2 | DOCUMENT MANAGEMENT | http://example.com/scan | 0 |
| ... | ... | ... | ... |
| N | BUSINESS FORM PRINT | http://example.com/print | 1 |
| N+1 | GENERAL APPLICATION A | http://example.com/aaa | 1 |

MULTIFUNCTION APPARATUSES EACH OF WHICH CARRIES OUT A COOPERATION PROCESS IN COOPERATION WITH AN APPLICATION WHICH IS EXECUTABLE ON AN EXTERNAL INFORMATION PROCESSING APPARATUS

This Nonprofessional application claims priority under 35 U.S.C. §119(a) on Patent Application No. 2010-160858 filed in Japan on Jul. 15, 2010, the entire contents of which are hereby incorporated by reference.

TECHNICAL FIELD

The present invention relates to a multifunction apparatus which operates in cooperation with an application of an information processing apparatus.

BACKGROUND ART

It is necessary for a printer employing an electrophotographic technology or a multifunction apparatus employing the electrophotographic technology to (i) stably drive a scanner motor and (ii) set a temperature of a fixing device to be within a predetermined range, so as to appropriately carry out a scanning process or a printing process. For this reason, a warm-up is carried out before, for example, the printing process is carried out, so that the fixing device has a temperature in the predetermined range when the printing process is started.

However, such a warm-up causes a user to wait until the warm-up is completed. In view of this, there has been known a technique for reducing a waiting time period of a user. According to the technique, in a case of, for example, a copying apparatus, the warm-up is triggered by an operation carried out by a user with respect to the copying apparatus, such as an input operation carried out via an operation panel, lifting up a cover of a scanner unit, or supplying a sheet to an auto feeder. Further, Patent Literature 1 discloses a method in which, before receiving print data from an external device, an image recording apparatus receives, from the external device, a specific command to warm up the image recording apparatus so that a warm-up of the image recording apparatus is started earlier than the receipt of the print data.

Furthermore, in recent years, a multifunction apparatus has been connected to a PC (personal computer) or the like via a communication network so as to carry out various processes. Specifically, the following technique has been developed. That is, a multifunction apparatus serves as a part of a total application system in such a manner that an application that is executable on an external information processing apparatus and a function of the multifunction apparatus operate in cooperation with each other (see Patent Literature 2).

CITATION LIST

Patent Literature

Patent Literature 1

Japanese Patent Application Publication, Tokukai, No. 2006-313452 A (Publication Date: Nov. 16, 2006)

Patent Literature 2

Japanese Patent Application Publication, Tokukai, No. 2007-174400 A (Publication Date: Jul. 5, 2007)

SUMMARY OF INVENTION

Technical Problem

According to the technique disclosed in Patent Literature 2, the multifunction apparatus carries out a process, such as a copying process or a printing process, on receipt of an instruction from an application that operates on the information processing apparatus. With the arrangement, however, the multifunction apparatus cannot recognize which process is to be carried out, until it receives the instruction from the application. Accordingly, the multifunction apparatus starts the warm-up after it receives the instruction from the application. This causes a user to wait for a long time until the warm-up of the multifunction apparatus is completed.

Such a problem may be solved by applying the technique disclosed in Patent Literature 1 to the technique disclosed in Patent Literature 2. That is, it is possible to cause the application to transmit, in advance, to the multifunction apparatus, a specific command for causing the multifunction apparatus to start carrying out the warm-up.

According to such a technique, however, it is necessary for the application to transmit a specific command to the multifunction apparatus. This causes an increase in cost for development of the application.

The present invention is made in view of the problems. An object of the present invention is to provide a multifunction apparatus which can reduce a user's waiting time period in a system in which an application that is executable on an external information processing apparatus and a function of the multifunction apparatus operate in cooperation with each other.

Solution to Problem

In order to attain the object, a multifunction apparatus of the present invention, which carries out a cooperation process in cooperation with an application selected from a plurality of applications which are executable on an external information processing apparatus, includes: a mode switching target member having (i) a normal operation mode and (ii) a waiting mode which is lower in power consumption than the normal operation mode, the mode switching target member being switchable between the normal operation mode and the waiting mode; an application information storage section in which application correspondence information is stored for each of the plurality of applications, the application correspondence information being such that (a) identification information for identifying the each of the plurality of applications and (b) function information indicating what function(s) has been carried out in a cooperation process carried out by the multifunction apparatus and the each of the plurality of applications, are associated with each other; and a control section for determining, in a case where the control section receives an instruction to start to carry out the cooperation process in cooperation with the application selected from the plurality of applications, whether or not a predetermined start condition is satisfied, the control section causing, in a case where it is determined that the predetermined start condition is satisfied, a switching operation or a part of the switching operation to be started, the switching operation switching the mode switching target member from the waiting mode to the normal operation mode, the predetermined start condition including at least the following Condition A.

Condition A: (1) function information, associated with identification information indicating the application selected from the plurality of applications, is found from the application information storage section, and (2) the function information found from the application information storage section indicates a specific function that causes the mode switching target member to operate.

Further, a multifunction apparatus of the present invention, which carries out a cooperation process in cooperation with an application selected from a plurality of applications which are executable on an external information processing apparatus, includes: a mode switching target member having (i) a normal operation mode and (ii) a waiting mode which is lower in power consumption than the normal operation mode, the mode switching target member being switchable between the normal operation mode and the waiting mode; an application information storage section in which application correspondence information is stored for each of the plurality of applications, the application correspondence information being such that (a) identification information for identifying the each of the plurality of applications and (b) function information indicating whether or not there has been a specific function which causes the mode switching target member to operate among a function(s) that has been carried out in a cooperation process carried out by the multifunction apparatus and the each of the plurality of applications, are associated with each other; and a control section for determining, in a case where the control section receives an instruction to start to carry out the cooperation process in cooperation with the application selected from the plurality of applications, whether or not a predetermined start condition is satisfied, the control section causing, in a case where it is determined that the predetermined start condition is satisfied, a switching operation or a part of the switching operation to be started, the switching operation switching the mode switching target member from the waiting mode to the normal operation mode, the predetermined start condition including at least the following Condition A.

Condition A: (1) function information, associated with identification information indicating the application selected from the plurality of applications, is found from the application information storage section, and (2) the function information found from the application information storage section indicates that there has been the specific function among the function(s) that has been carried out in the cooperation process.

Advantageous Effects of Invention

According to the present invention, it is possible to reduce a user's waiting time period in a system in which an application that is executable on an external information processing apparatus and a function of a multifunction apparatus operate in cooperation with each other.

BRIEF DESCRIPTION OF DRAWINGS

FIG. 2
FIG. 2 is a view showing an example of an application information management table stored in an application information storage section included in a multifunction apparatus in accordance with Embodiment 1 of the present invention.
FIG. 7
FIG. 7 is a view showing an example of execution authority information stored in a user information management DB.
FIG. 9
FIG. 9 is a view showing an example of a management table for managing output sheet number limiting information.
FIG. 10
FIG. 10 is a view showing an example of an application information management table stored in an application information storage section included in a multifunction apparatus in accordance with Embodiment 3 of the present invention.
FIG. 12
FIG. 12 is a view showing an application information management table in accordance with Modified Example 1 of the present invention.
FIG. 14
FIG. 14 is a view showing an application information management table in accordance with Modified Example 2 of the present invention.
FIG. 15
FIG. 15 is a view showing an application information management table in accordance with Modified Example 3 of the present invention.
FIG. 16
FIG. 16 is a view showing an application information management table in accordance with Modified Example 4 of the present invention.

DESCRIPTION OF EMBODIMENTS

[Embodiment 1]
One embodiment of the present invention is described below with reference to FIGS. 1 through 5. The following description deals with one embodiment of a multifunction apparatus control system of the present invention.

Figure 1:
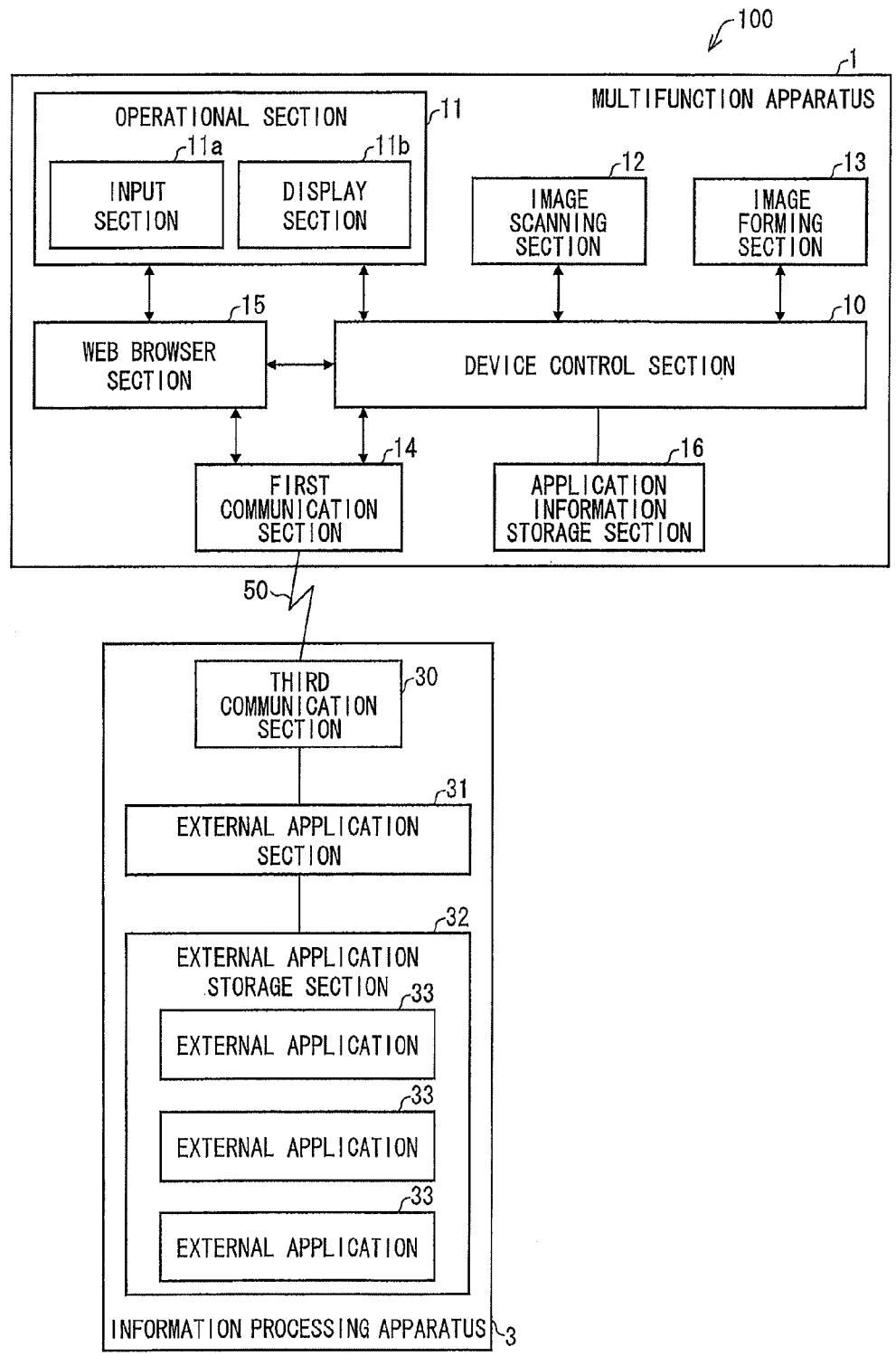
FIG. 1
FIG. 1 is a block diagram illustrating an arrangement of a multifunction apparatus control system in accordance with Embodiment 1 of the present invention.

<Arrangement of Multifunction Apparatus Control System 100>
FIG. 1 is a block diagram illustrating an arrangement of a multifunction apparatus control system 100 in accordance with one embodiment of the present invention. The multifunction apparatus control system 100 includes a multifunction apparatus 1 and an information processing apparatus 3, which communicate with each other via a communication network 50 (see FIG. 1).

Examples of the communication network 50 encompass the Internet, a telephone line, a serial cable, and other wired or wireless communication lines. The multifunction apparatus 1 and the information processing apparatus 3 communicate with each other by use of an HTTP (Hyper Text Transfer Protocol) or an SOAP (Simple Object Access Protocol).

As a matter of course, in the multifunction apparatus control system 100, (i) a plurality of multifunction apparatuses 1 can be provided instead of a single multifunction apparatus 1, and (ii) a plurality of information processing apparatuses 3 can be provided instead of a single information processing apparatus 3. Note that, in the present embodiment, an application program (application software) is merely referred to as "application".

<Configuration of Multifunction Apparatus 1>

The multifunction apparatus 1 is a digital multifunction apparatus or an analogue multifunction apparatus, which carries out various functions (such as a scanning function, a printing function, and a communicating function). The multifunction apparatus 1 includes a device control section 10, an operational section 11, an image scanning section 12, an image forming section 13, a first communication section 14, a web browser section 15, and an application information storage section 16.

The operational section 11 is a user interface via which (i) a user is notified of various information and (ii) the multifunction printer 1 receives an input from the user. The operational section 11 includes an input section 11a having various input keys, and a display section 11b such as an LCD (Liquid Crystal Display). Note that the operational section 11 can be a touch panel in which the input section 11a and the display section 11b are integrally provided.

The image scanning section 12 includes a scanner and a document carrying section which carries a document to the scanner. The image scanning section 12 scans, as image data, objects (such as characters and images) which are printed on a document. Note that the image scanning section scans an image so that a scanned image has a predetermined resolution.

The image forming section 13 is provided for printing an image (character/photograph/graphic) on a recording sheet such as paper in accordance with inputted image data. The image forming section 13 includes a photoreceptor drum, a charging device, an exposure device, a developing device, a transfer device, a fixing device, and a sheet tray. Specifically, the image forming section 13 carries out the printing in the following manner. First, a surface of the photoreceptor drum is electrostatically charged by the charging device. Then, the photoreceptor drum is irradiated with light by the exposure device in accordance with image data, so that a pattern identical with an image indicated by the image data is charged on the photoreceptor drum. After that, a toner is supplied to the surface of the photoreceptor drum by the developing device. Then, the transfer device transfers a toner image to a recording sheet. Ultimately, the fixing device applies heat to the toner so that the toner is melt and fixed to the recording sheet. An image is formed on a recording sheet in this manner. Such a printing process is carried out on the basis of image data received from the image scanning section 12 or image data received from an external device.

Here, application of sufficient heat to the toner is necessary to appropriately carry out the fixing of the toner. Therefore, it is necessary to sufficiently supply electricity to a heater of the fixing device so as to cause a part of the fixing device to have a temperature in a predetermined range (e.g., in a range of 160° C. to 180° C.), which part is to be in contact with the toner. In terms of energy conservation, however, it is preferable to suppress power consumption of the heater of the fixing device as much as possible. For this reason, the image forming section 13 has a normal operation mode and a waiting mode. According to the normal operation mode, the contact area of the surface of the fixing device, which contact area is to be in contact with the toner, is set to have an appropriate temperature to fix the toner on the recording sheet. On the other hand, according to the waiting mode, the power consumption is suppressed to be lower than that of the normal operation mode. In other words, the fixing device is set so that the heater of the fixing device receives less electric power in the waiting mode than in the normal operation mode. A warm-up is a process for switching the image forming section 13 from the waiting mode to the normal operation mode. The image forming section 13 carries out the warm-up before carrying out the printing process. Further, the normal operation mode is switched to the waiting mode, in a case where no instruction to carry out another printing process is made within a predetermined time period since the printing process was completed. Note that the image forming section 13 starts the warm-up of the fixing device in accordance with an instruction received from the device control section 10. In this manner, the image forming section 13 serves as a mode switching target member that has the normal operation mode and the waiting mode. According to the present embodiment, a function for which the warm-up is necessary is a function which causes the image forming section 13 to operate, which warm-up is the process for switching the image forming section 13 from the waiting mode to the normal operation mode.

The first communication section 14 is an interface which communicates with an external device such as an information processing apparatus 3 via the communication network 50. According to the present embodiment, the first communication section 14 communicates with the information processing apparatus 3 by use of the HTTP or the SOAP.

The web browser section 15 operates in accordance with software of a web browser. The web browser section 15 communicates with an external application section 31 of the information processing apparatus 3 when the multifunction apparatus 1 and the information processing apparatus 3 operate in cooperation with each other.

The application information storage section 16 stores an application information management table in which application correspondence information is stored for each of a plurality of external applications 33. The application correspondence information includes three sorts of information which are associated with each other, namely, (i) application identification information (application name or the like) with which the external application 33 included in the information processing apparatus 3 is identified, (ii) a registration address (a URL in the present embodiment,) which is used to access the external application 33, and (iii) function information indicating what function(s) of the multifunction apparatus 1 has been previously carried out in a cooperation process carried out by the multifunction apparatus 1 and the external application 33 in cooperation with each other. The registration address can be also included in examples of the identification information with which the external application 33 is identified. FIG. 2 is a view showing an example of the application information management table. In FIG. 2, the application correspondence information for each of the plurality of external applications 33 is associated with a corresponding ID. Further, the application correspondence information corresponds to each of the plurality of externals applications 33 stored in the information processing apparatus 3 one by one.

The device control section 10 controls each of the sections of the multifunction apparatus 1. Specifically, the device control section 10 controls each of operations of the sections such as the operational section 11, the image scanning section 12, the image forming section 13, the first communication section 14, and the web browser section 15. For example, the device control section 10 controls the image scanning section 12 to obtain data of a scanned image. Furthermore, the device control section 10 controls the image forming section 13 to (i) form an image indicated by inputted image data on a sheet and (ii) eject the sheet, for example.

Further, the device control section 10 also serves as an updating section which (i) registers information in the application information management table stored in the application information storage section 16 and (ii) updating the application information management table stored in the application information storage section 16. The process for registering information to the application information management table and the process for updating the application information management table will be described later in detail.

Furthermore, the device control section 10 (i) stores inputted image data in a designated external device (e.g. the information processing apparatus 3) via the first communication section 14 or (ii) transmits, to a designated address via the first communication section 14, an e-mail to which the inputted image data is attached.

The multifunction apparatus 1 having such an arrangement receives, from the information processing apparatus 3, HTML (Hypertext Markup Language) data indicating an operation screen, and causes the web browser section 15 to display the operation screen indicated by the HTML data, for example. Then, the multifunction apparatus 1 transmits, to the external application section 31 of the information processing apparatus 3, information entered via the operation screen. After that, the multifunction apparatus carries out its function in accordance with a control command received from the external application section 31.

<Configuration of Information Processing Apparatus 3>

Next, the following description deals with a configuration of the information processing apparatus 3. The information processing apparatus 3 is a computer device constituted by an arithmetic processing section such as a CPU or a special purpose processor, and a storage section such as an RAM, a ROM, or an HDD, and serves as a web server device that is shared by a plurality of multifunction apparatuses 1. The information processing apparatus 3 includes a third communication section 30, the external application section 31, and an external application storage section 32.

The third communication section 30 is an interface which communicates with an external device such as the multifunction apparatus 1 via the communication network 50. According to the present embodiment, the third communication section 30 communicates with the multifunction apparatus 1 by use of the HTTP or the SOAP, as described above.

The external application storage section 32 stores various external applications 33, each of which is used to control the multifunction apparatus 1.

The external application section 31 carries out an operation in accordance with a predetermined web application. That is, the external application section 31 carries out an operation in accordance with a corresponding one of various web applications which operate on a web server. Such web applications are custom applications described in, for example, Java (registered trademark) script, and operate in a Java (registered trademark) script execution environment provided on the web server. The external application section 31 reads out, from the external application storage section 32, an external application 33 requested by the multifunction apparatus 1, and carries out an operation in accordance with the external application 33.

<Process for Registering Information to Application Information Management Table and Process for Updating Application Information Management Table>

Next, the following description deals with (i) the process for registering information to the application information management table stored in the application information storage section 16, and (ii) the process for updating the application information management table. In a case where the device control section 10 receives, via an operational section 11, an instruction to register a new external application to the application information management table, the device control section 10 urges a user to enter (i) application identification information such as an application name and (ii) a registration address which is used to access the external application. On receipt of such information, the device control section 10 adds, to the application information management table, application correspondence information in which (i) the application identification information entered by the user, (ii) the registration address entered by the user, and (iii) corresponding function information are associated with each other. Here, the device control section 10 registers "None" as the function information.

Further, in a case where the multifunction apparatus 1 receives an instruction to edit the application identification information or the registration address which has been already registered in the application information management table, the device control section 10 urges the user to enter an instruction to select target application correspondence information to be edited. On receipt of such an instruction, the device control section 10 causes the application identification information and a registration address, both of which correspond to the target application correspondence information selected by the user, to be displayed, so as to urge the user to enter an instruction to edit the application correspondence information. After that, the device control section 10 updates, in accordance with the instruction entered by the user, the application correspondence information selected by the user. Here, the device control section 10 changes the device information corresponding to the target application correspondence information into "None".

Furthermore, the device control section 10 (i) identifies application correspondence information which corresponds to an external application 33 that is carrying out the cooperation process with the multifunction apparatus 1, and (ii) adds, to the function information corresponding to the application correspondence information, information indicating a type of a function that is requested to be carried out on a control command received from the information processing apparatus 3 in the cooperation process. Specifically, the device control section 10 checks whether or not the information indicating the type of the function that has been requested to be carried out on the control command is included in the function information. In a case where such information is included in the function information, the device control section 10 does not update the function information. On the other hand, in a case where such information is not included in the function information, the device control section 10 adds, to the function information, the information indicating the type of the function that has been requested to be carried out on the control command.

<Outline of Cooperation Process>

Next, the following description deals with the cooperation process in which one of the plurality of external applications 33 and the multifunction apparatus 1 operate in cooperation with each other. First, the device control section 10 of the multifunction apparatus 1 reads out, from the application information storage section 16, a registration address that is associated with the application identification information selected by the user. Then, the device control section 10 starts up the web browser section 15 and causes the web browser section 15 to access a URL indicated by the registration address. This causes the web browser section 15 to communicate with the external application section 31 of the information processing apparatus 3. The web browser section 15 receives data of an operation screen from the external application section 31, and displays the operation screen indicated by the data, for example. Further, when information is entered via the operation screen, the web browser section 15 transmits the information to the external application section 31. On receipt of such information, the external application section 31 carries out a predetermined process in accordance with the information received from the web browser section 15 so as to (i) create a control command to control a corresponding function of the multifunction apparatus 1 and (ii) transmit the control command to the multifunction apparatus 1. In response to the control command, the device control section 10 of the multifunction apparatus 1 controls each of the sections of the multifunction apparatus 1 so that the function corresponding to the control command is carried out. In this manner, the multifunction apparatus 1 and one of the plurality of external applications 33 of the information processing apparatus 3 carries out the cooperation process in cooperation with each other.

In the cooperation process, the multifunction apparatus transmits, to the information processing apparatus 3, information to which device information that is inherent in the multifunction apparatus 1 is added. Here, the device information is identification information with which the multifunction apparatus 1 can be discriminated from other devices (such as other multifunction apparatuses). Examples of the device information of the multifunction apparatus 1 encompass a device number (serial number) inherent in the multifunction apparatus 1 and a MAC (Media Access Control) address inherent in the multifunction apparatus 1. With the use of the device information, the information processing apparatus 3 can identify the multifunction apparatus 1 to be controlled by the information processing apparatus 3.

Further, the multifunction apparatus 1 causes the information processing apparatus 3 to read out a function of an external application 33 (hereinafter, referred to as "external application function"), and obtains, from the information processing apparatus 3, a result of a process carried out by the external application 33. One external application function corresponds to one external application 33 among a plurality of external applications 33 stored in the information processing apparatus 3. It is possible to provide the multifunction apparatus 1 with one external application function per external applications 33 stored in the information processing apparatus 3.

Here, the multifunction apparatus 1 and the external application section 31 communicate with each other by use of a standard network technique. This makes it possible to use a lot of general tools and skills in development of a collaboration part between the device control section 10 (firmware in the device control section 10) and the external application section 31. Accordingly, it is easy to provide the multifunction apparatus 1 with the external application functions, and it is possible to reduce a cost in development of the collaboration part.

<How Process is Carried Out>

Figure 3:
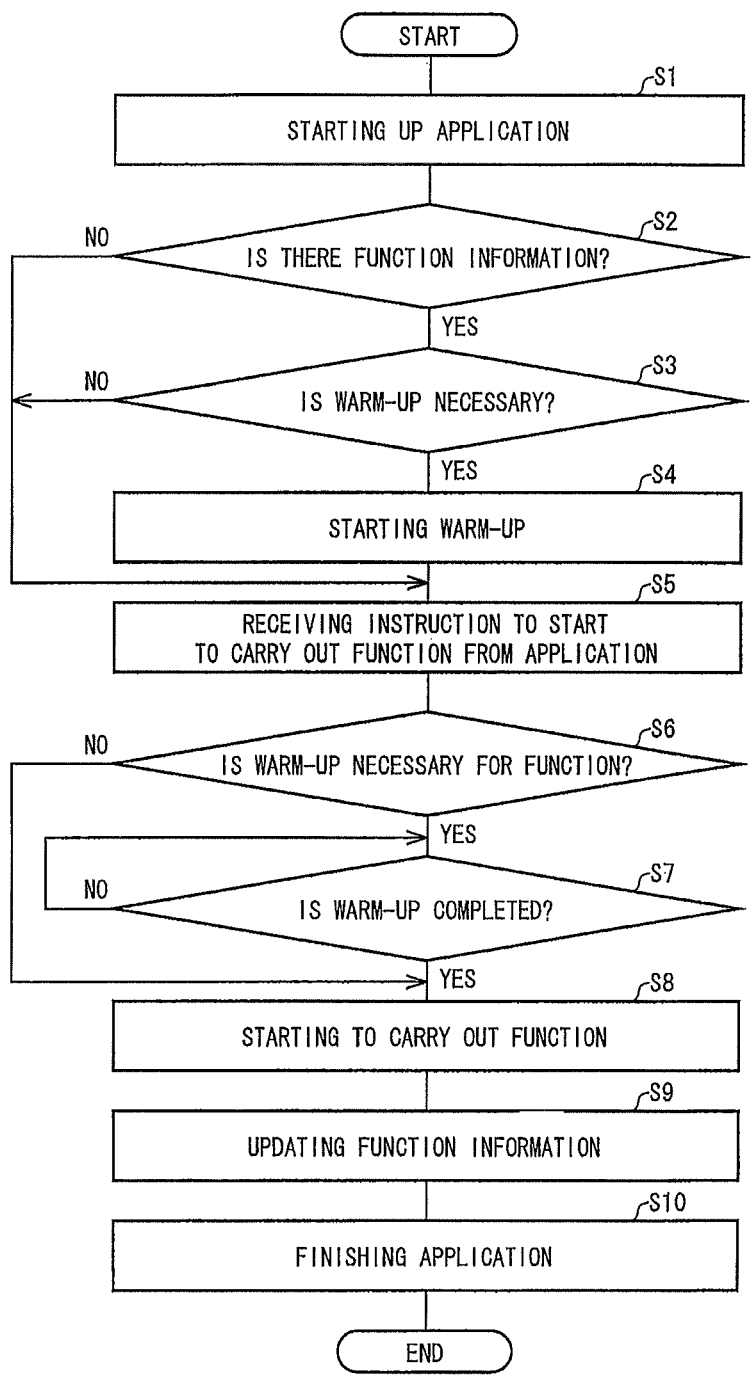
FIG. 3
FIG. 3 is a flowchart showing how a process is carried out in the multifunction apparatus control system in accordance with Embodiment 1 of the present invention.

Next, the following description deals with how a process is carried out in the multifunction apparatus control system 100 of the present embodiment. Here, a warm-up, which is a characteristic process of the present invention, is mainly described. FIG. 3 is a flowchart showing how a process is carried out in the multifunction apparatus control system 100.

Figure 4:
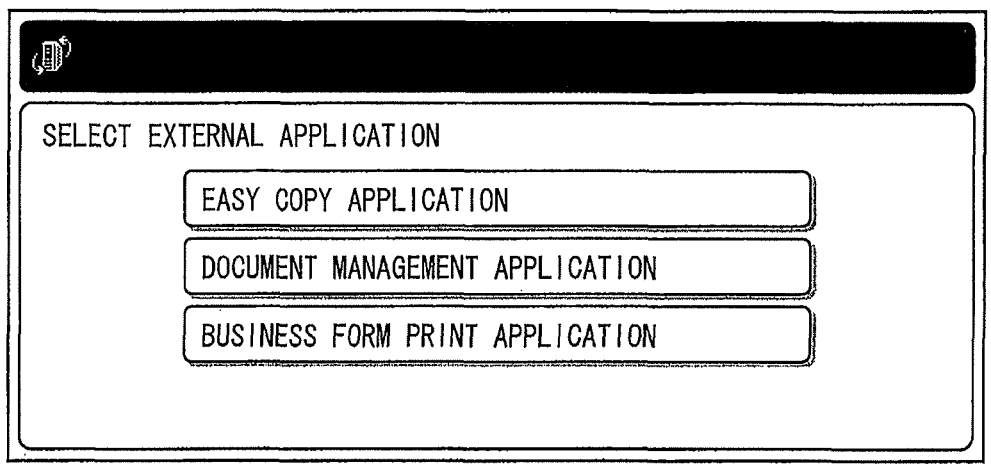
FIG. 4
FIG. 4 is a view showing an example of a screen in which an application identification information list is shown.
Figure 5:
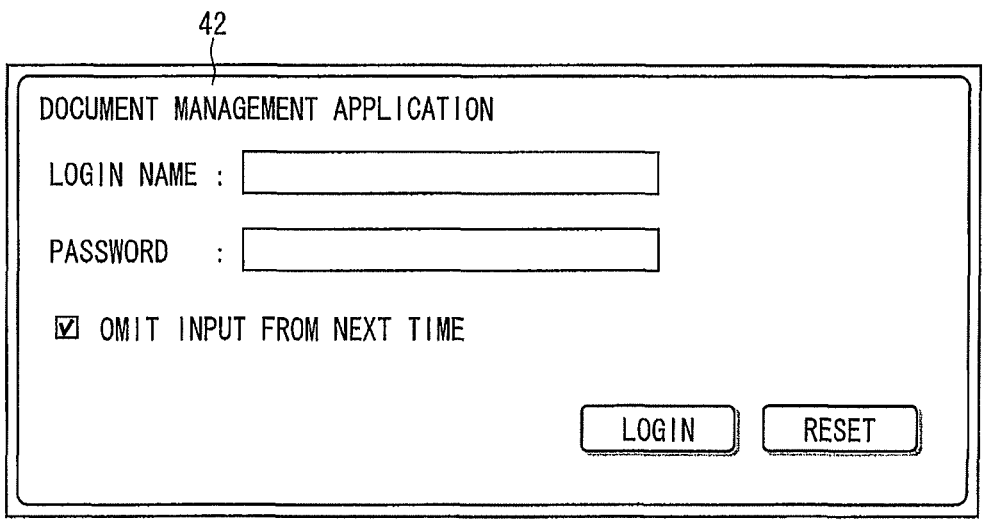
FIG. 5
FIG. 5 is a view showing an example of an operation screen which is displayed on the multifunction apparatus in a cooperation process carried out by an external application and the multifunction apparatus in cooperation with each other.

First, the device control section 10 causes the display section 11b to display an application identification information list in the application information management table stored in the application information storage section 16, so as to urge the user to enter selection of target application identification information. FIG. 4 is an example of a screen showing the application identification information list. On receipt of such selection, the device control section 10 starts up the web browser section 15 and causes the web browser section 15 to access a URL indicated by a registration address associated with the application identification information selected by the user (S1). Here, an application indicated by the application identification information selected by the user is referred to as "selected application". The web browser section 15 and the information processing apparatus 3 transmits data to/from each other, such as data of an operation screen and a control command. For example, the external application section 31 transmits, to the multifunction apparatus 1, data indicating an operation screen via which a process to log in one of the plurality of external applications 33 can be carried out.

Next, the device control section 10 determines whether or not there is function information associated with the application identification selected by the user, on the basis of the application information management table (S2).

In a case where it is determined that there is the function information, that is, in a case where the function information does not indicates "None" (Yes in S2), the device control section 10 determines whether or not a function(s) indicated by the function information is a function(s) for which the warm-up is necessary (S3). Here, the function for which the warm-up is necessary is a function that causes the mode switching target member to operate. The mode switching target member has the waiting mode and the normal operation mode, between which the mode switching target member is switchable. According to the present embodiment, the multifunction apparatus 1 includes the image forming section 13 as the mode switching target member, and either a printing function or a copying function serves as the function that causes the image forming section 13 to operate. The device control section 10 has stored, in advance, for each of a plurality of functions, warm-up necessary/unnecessary information which indicates whether or not the each of the plurality of functions is the function for which the warm-up is necessary. The device control section 10 carries out the step of S3 in accordance with the warm-up necessary/unnecessary information. According to the present embodiment, the device control section stores the warm-up necessary/unnecessary information for each of the plurality of functions, in advance, so that only the warm-up necessary/unnecessary information for the printing function and the warm-up necessary/unnecessary information for the copying function indicate that the warm-up is necessary.

In a case where it is determined that the warm-up is necessary for that function (Yes in S3), the device control section 10 starts the warm-up of the image forming section 13 (S4). That is, the device control section 10 causes a switching operation to be started, which switching operation switching the image forming section 13 from the waiting mode to the normal operation mode. Then, the process proceeds to the step of S5.

Meanwhile, in a case where the function information associated with the identification information selected by the user indicates "None" (No in S2) or in a case where the function indicated by the function information is not the function for which the warm-up is necessary (No in S3), the process also proceeds to the step of S5.

Next, in the step of S5, the device control section 10 accepts a control command transmitted from one of the plurality of external applications 33 of the information processing apparatus 3 (S5).

When the device control section 10 receives the control command from the one of the plurality of external applications 33, the device control section 10 determines whether or not the function which is requested to be carried out on the control command is the function for which the warm-up is necessary (S6). The determination can be carried out on the basis of the warm-up necessary/unnecessary information for the function.

In a case where the control command does not instruct execution of the function for which the warm-up is necessary (No in S6), the device control section 10 starts to carry out the function corresponding to the control command (S8).

On the other hand, in a case where the control command instructs execution of the function for which the warm-up is necessary (Yes in S6), the device control section 10 waits until the warm-up is completed, that is, until the image forming section 13 serving as the mode switching target member is caused to be in the normal operation mode (S7). Then, after the warm-up is completed (Yes in S7), that is, after the waiting mode is switched to the normal operation mode, the device control section 10 causes the function corresponding to the control command to be carried out (S8).

Then, the device control section 10 carries out an updating process so as to update the function information associated with the application identification information selected by the user in the step of S1 (S9). The following description deals with details of the updating process. The device control section 10 creates information indicating a type of the function that was carried out on the control command received in the step of S5. Then, the device control section 10 checks whether or not the information created by the device control section 10 has been already included in the function information associated with the application identification information selected by the user in the step of S1. In a case where such information has been already included in the function information, the device control section 10 would not update the application correspondence information, and leave the application correspondence information as it is. On the other hand, in a case where such information has not been included in the function information associated with the application identification information selected by the user in the step of S1, the device control section 10 causes the function information to include such information. This allows the application correspondence information for each of the plurality of external applications 33 to include function information which indicates what function(s) has been carried out with the each of the plurality of external applications 33.

Then, on receipt of a termination command from the one of the plurality of external applications 33, the device control section 10 (i) determines that the cooperation process carried out by the multifunction apparatus 1 and the one of the plurality of external applications 33, indicated by the application identification information selected by the user in the step of S1, has been completed, and (ii) causes the display section 11b of the operational section 11 to display an initial screen again (S10). The cooperation process is completed in this manner.

As described above, according to the present Embodiment 1, the device control section 10 finds, from the application information storage section 16, the function information associated with the application identification information selected by the user in the step of S1. Then, the device control section 10 determines whether or not a type of the function, indicated by the function information found by the device control section 10, indicates the function for which the warm-up is necessary, i.e., a specific function that causes the image forming section 13 serving as the mode switching target member to operate. After that, in a case where the function information found by the device control section 10 indicates the function for which the warm-up is necessary, the device control section 10 starts the warm-up of the image forming section 13, which warm-up is a switching operation for switching the image forming section 13 from the waiting mode to the normal operation mode. This makes it possible to start the switching operation for switching the image forming section 13 from the waiting mode to the normal operation mode, before the multifunction apparatus 1 receives an instruction to start carrying out the function for which the warm-up is necessary. Therefore, it is possible to reduce a user's waiting time period.

[Embodiment 2]

Another embodiment of the present invention is described below with reference to FIGS. 6 through 9. Note that members having functions identical with those described in the aforementioned embodiment have signs identical with those used in the aforementioned embodiment, and their explanations are omitted here for the sake of simple explanation.

Figure 6:
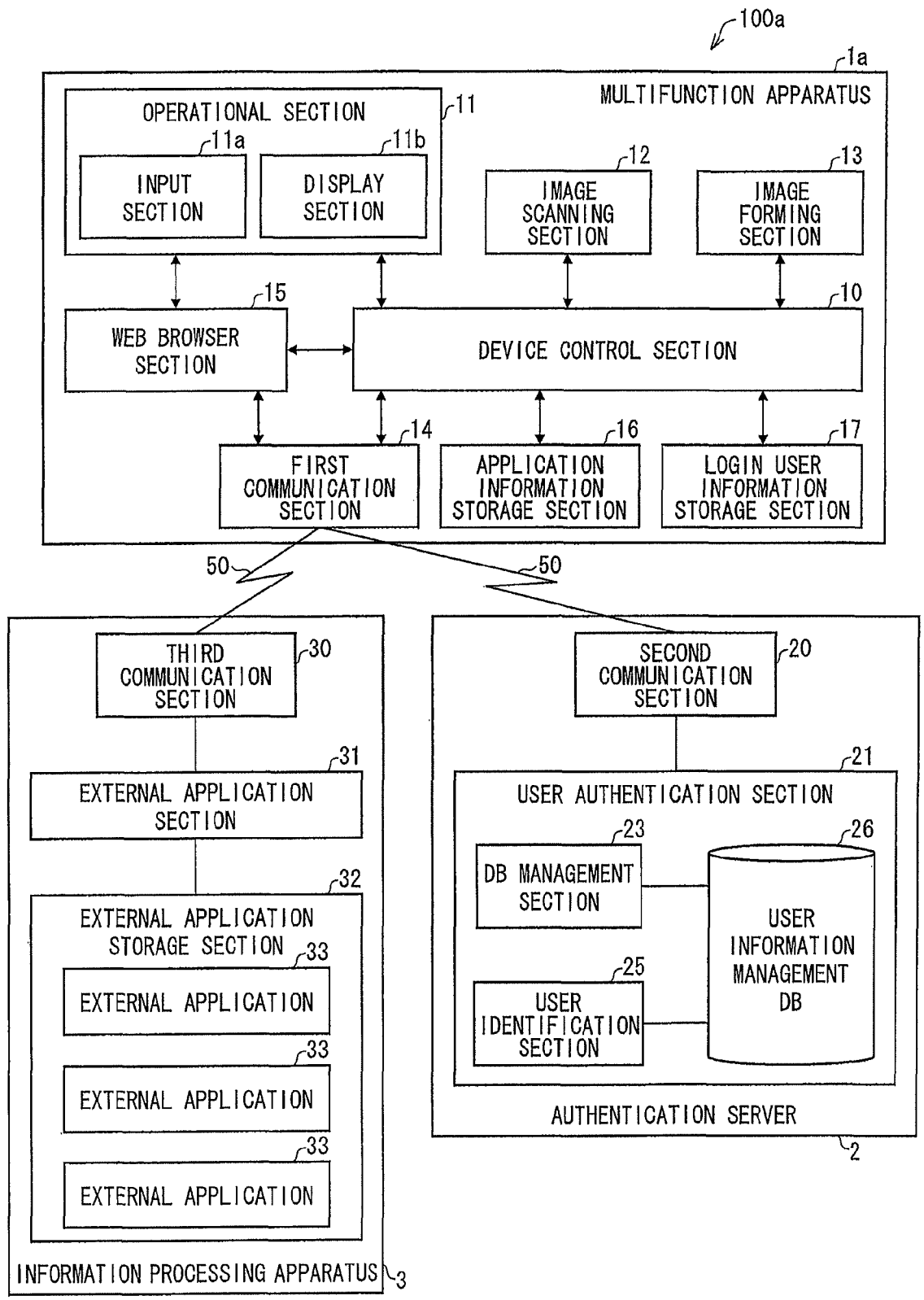
FIG. 6
FIG. 6 is a view illustrating an arrangement of a multifunction apparatus control system in accordance with Embodiment 2 of the present invention.

FIG. 6 is a view illustrating an arrangement of a multifunction apparatus control system 100a of Embodiment 2 of the present invention. In addition to a multifunction apparatus 1a and an information processing apparatus 3, the multifunction apparatus control system 100a includes an authentication server 2 (see FIG. 6).

The authentication server 2 is a computer device constituted by an arithmetic processing section such as a CPU or a special purpose processor, and a storage section such as an RAM, a ROM, or an HDD. The authentication server 2 serves as a device which carries out authentication with respect to a multifunction apparatus 1a. The multifunction apparatus 1a and the authentication server 2 communicate with each other by use of, for example, an LDAP (Light Directory Access Protocol).

The authentication server 2 includes a second communication section 20 and a user authentication processing section 21. The second communication section 20 is an interface which communicates with an external device such as the multifunction apparatus 1a.

The user authentication processing section 21 carries out an authentication process with respect to a user. The user authentication processing section 21 includes a user authentication section 25, a user information management database (DB) 26, and a database (DB) management section 23.

In the user information management DB 26, user registration information has been registered in advance per user. The user information management DB 26 stores, as the user registration information, user authentication information (e.g., a login name or a password) which is used in the authentication process so that the user is allowed to operate the multifunction apparatus 1a. In addition to the user authentication information, the user information management DB 26 also stores execution authority information indicating which function(s)

the user is allowed to use. FIG. 7 is a view showing an example of the execution authority information stored in the user information management DB 26. As shown in FIG. 7, the user information management DB 26 stores, for each of a plurality of users of the multifunction apparatus 1*a*, the execution authority information indicating which function(s) of the multifunction apparatus 1*a* the user is allowed to use.

The user authentication section 25 obtains login information transmitted from the multifunction apparatus 1*a*, and carries out the authentication process by checking whether or not the login information matches the user registration information that has been stored in the user information management DB 26 in advance. Then, in a case where the authentication was successful, the user authentication section 25 obtains the execution authority information corresponding to that user, and transmits, to the multifunction apparatus 1*a*, (i) the execution authority information and (ii) an authentication result indicating that the authentication was successful. On the other hand, in a case where the authentication was unsuccessful, the user authentication section 25 transmits, to the multifunction apparatus 1*a*, an authentication result indicating that the authentication was unsuccessful.

Further, the multifunction apparatus 1*a* of the present embodiment is different from the multifunction apparatus 1 of Embodiment 1 in that the multifunction apparatus 1*a* further includes a login user information storage section 17.

A device control section 10 of the multifunction apparatus 1*a* of the present embodiment urges a user to enter login information. In a case where the multifunction apparatus 1*a* receives the login information from the user, the device control section 10 causes the login information to be transmitted to the authentication server 2. In a case where the authentication result received from the authentication server 2 indicates that the authentication was unsuccessful, the device control section 10 would not accept, from the user, an instruction to carry out any of various functions of the multifunction apparatus 1*a*. On the other hand, in a case where the authentication result received from the authentication server 2 indicates that the authentication was successful, the device control section 10 (i) causes an operation screen (such as a screen shown in FIG. 4) to be displayed so as to urge the user to enter selection of an external application 33 out of the plurality of external application 33 and (ii) stores, in the login user information storage section 17, the execution authority information which was received with the authentication result. Further, on receipt of a completion notice from the external application 33, the device control section 10 deletes the execution authority information stored in the login user information storage section 17. This allows the login user information storage section 17 to store the execution authority information corresponding to the user who is being in a login state.

According to the present embodiment, the device control section 10 starts a warm-up only when the execution authority information stored in the login user information storage section 17 indicates that the user is allowed to use the function for which the warm-up is necessary.

Figure 8:
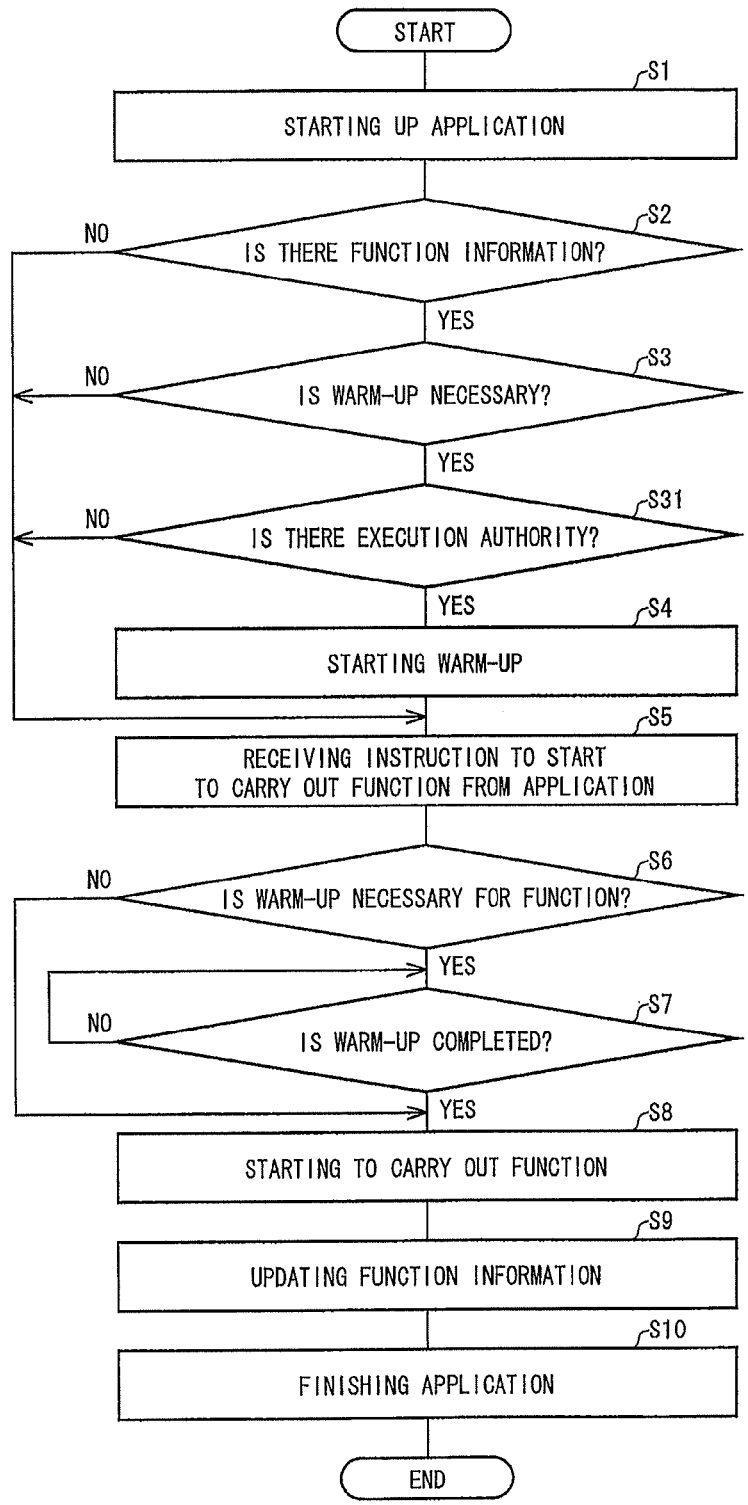
FIG. 8
FIG. 8 is a flowchart showing how a process is carried out in the multifunction apparatus control system in accordance with Embodiment 2 of the present invention.

The following description deals with how the warm-up is carried out in the multifunction apparatus control system 100*a* of the present embodiment. FIG. 8 is a flowchart showing how the warm-up is carried out in the multifunction apparatus control system 100*a*.

Unlike the process shown in FIG. 3, the process carried out by the multifunction apparatus control system 100*a* includes the step of S31 (see FIG. 8). For this reason, the following description mainly deals with the step of S31.

The device control section 10 determines whether or not the warm-up is necessary for the function(s) indicated by function information (S3) (see FIG. 8). In a case where it is determined that the warm-up is necessary for the function(s) (Yes in S3), the device control section 10 carries out the step of S31. In the step of S31, the device control section 10 checks the execution authority information stored in the login user information storage section 17, so as to determine whether or not the user is allowed to use the function for which the warm-up is necessary. Only in a case where it is determined that the user is allowed to use the function for which the warm-up is necessary (Yes in S31), the device control section 10 starts the warm-up (S4). In a case where it is determined that the user is not allowed to use the function for which the warm-up is necessary (No in S31), the device control section 10 does not start the warm-up because the function is not to be carried out.

In a case where, for example, the execution authority information corresponding to a user ID of "1" (see FIG. 7) is stored in the login user information storage section 17, the copying function and the printing function of the image forming section 13, for either of which the warm-up is necessary, can be used. Therefore, the device control section 10 starts the warm-up of the image forming section 13. On the other hand, in a case where the execution authority information corresponding to a user ID of "2" (see FIG. 7) is stored in the login user information storage section 17, neither the copying function nor the printing function of the image forming section 13, for either of which the warm-up is necessary, can be used. In this case, the device control section 10 does not start the warm-up of the image forming section 13. Note that, in a case where the use of one of the copying function and the printing function of the image forming section 13, for either of which the warm-up is necessary, is allowed, the device control section 10 starts the warm-up.

As described above, according to the present embodiment, the device control section 10 starts the warm-up of the image forming section 13 only in a case where the following conditions A and B are satisfied (i.e., only in a case where both the steps of S3 and S31 indicate "Yes").

Condition A: Function information associated with application identification information selected by a user in the step of S1 indicates a function for which the warm-up is necessary.

Condition B: Execution authority information stored in the login user information storage section 17 indicates that the user is allowed to use the function for which the warm-up is necessary.

This makes it possible to prevent the warm-up from being unnecessarily carried out for the function that the user is not allowed to use.

In the aforementioned descriptions, the user information management DB 26 of the authentication server 2 (i) stores the execution authority information shown in FIG. 7, in addition to the user authentication information, and (ii) transmits, to the multifunction apparatus 1*a*, the execution authority information corresponding to the user who is being in the login state. However, the present embodiment is not limited to this. The user information management DB 26 can store output sheet number limiting information per user, instead of the execution authority information. FIG. 9 is a view showing an example of a management table for managing the output sheet number limiting information. As shown in FIG. 9, the output sheet number limiting information is information that (i) is set per user and (ii) indicates, for each of the plurality of functions of the multifunction apparatus 1*a*, how many sheets that user is allowed to use (the number of remaining sheets that user is allowed to use). In this case, the authentication server 2 obtains information on the number of sheets outputted from each of the multifunction apparatuses 1a, and updates corresponding output sheet number limiting information.

In a case where the user authentication was successful, the authentication server 2 transmits, to the multifunction apparatus 1a, the output sheet number limiting information corresponding to the user who has logged in with the use of the authentication result. Then, the device control section 10 of the multifunction apparatus 1a stores, in the login user information storage section 17, the output sheet number limiting information received from the authentication server 2. Further, on receipt of a completion notice from the external application 33, the device control section 10 deletes the output sheet number limiting information stored in the login user information storage section 17. This allows the login user information storage section 17 to store the output sheet number limiting information corresponding to the user who is being in the login state.

In this case, the device control section 10 checks, in the step of S31, the output sheet number limiting information stored in the login user information storage section 17, so as to determine whether or not the number of sheets that the user is allowed to use by use of a corresponding function, for which the warm-up is necessary, is not less than 1. In a case where it is determined that the number of sheets that the user is allowed to use by use of the function is not less than 1, the device control section 10 (i) determines that the user is allowed to use the function (Yes in S31), and (ii) starts the warm-up (S4). On the other hand, in a case where it is determined that the number of sheets that the user is allowed to use by use of the function is 0, the device control section 10 (i) determines that the user is not allowed to use the function (No in S31), and (ii) does not start the warm-up.

In a case where, for example, the output sheet number limiting information corresponding to the user ID of "1" (see FIG. 9) is stored in the login user information storage section 17, the number of sheets that the user is allowed to use by use of the copying function, for which the warm-up of the image forming section 13 is necessary, is 154. Therefore, the device control section 10 starts the warm-up. On the other hand, in a case where the output sheet number limiting information corresponding to the user ID of "2" (see FIG. 9) is stored in the login user information storage section 17, (i) the number of sheets that the user is allowed to use by use of the copying function, for which the warm-up of the image forming section 13 is necessary, is 0, and also (ii) the number of sheets that the user is allowed to use by use of the print function, for which the warm-up of the image forming section 13 is necessary, is 0. In this case, the device control section 10 does not start the warm-up.

As described above, the device control section 10 starts the warm-up of the image forming section 13 only in a case where the following Conditions A and C are satisfied.

Condition A: Function information corresponding to application identification information selected by a user in the step of S1 indicates a function for which the warm-up is necessary.

Condition C: Output sheet number limiting information stored in the login user information storage section 17 indicates 1 or more, as the number of sheets that the user is allowed to use by use of the function for which the warm-up is necessary.

This makes it possible to prevent the warm-up from being unnecessarily carried out for a function that the user is not allowed to use.

Further, the user information management DB 26 of the authentication server 2 can store both the execution authority information shown in FIG. 7 and the output sheet number limiting information shown in FIG. 9. In this case, the authentication server 2 transmits, to the multifunction apparatus 1a, (i) the authentication result indicating that the authentication was successful, (ii) the execution authority information corresponding to the user who is being in the login state, and (iii) the output sheet number limiting information corresponding to the user who is being in the login state. Then, the login user information storage section 17 of the multifunction apparatus 1a stores the execution authority information and the output sheet number limiting information, both of which have been received from the authentication server 2.

Then, in the step of S31, the device control section 10 checks both the execution authority information and the output sheet number limiting information, so as to determine whether or not the user is allowed to use the function, which has been determined in the step of S3 as the function for which the warm-up is necessary. That is, only in a case where both the execution authority information and the output sheet number limiting information indicate that the user is allowed to use the function, the warm-up is started. In a case where at least one of the execution authority information and the output sheet number limiting information indicates that the user is not allowed to use the function, the warm-up is not started.

[Embodiment 3]

Among various applications, there is a multifunction application that can carry out various functions. For example, there is a multifunction application that can carry out only a printing function in response to a user's instruction, and also can carry out only a scanning function in response to another user's instruction. In a case it is determined, on the basis of only information on what function has been previously carried out (as in Embodiment 1), whether or not a warm-up is necessary for such a multifunction application, there may be a case where the warm-up is unnecessarily carried out for a function for which the warm-up is unnecessary. For example, the warm-up might be unnecessarily carried out for the scanning function in a case where (i) a user has carried out the printing function with the multifunction application and (ii) the user does not carry out the printing function this time but only the scanning function. An arrangement of the present embodiment is made in view of the problem. The arrangement of the present embodiment is higher in energy saving effect than that of Embodiment 1.

The present embodiment is described below in detail with reference to FIGS. 10 and 11. Note that members having functions that are identical with those of the members in the above description have signs that are identical with those of the members in the above description, and their explanations are omitted here for the sake of simple explanation.

FIG. 10 is a view showing an example of an application information management table stored in an application information storage section 16 of a multifunction apparatus 1 of the present embodiment. As shown in FIG. 10, the application information storage section 16 stores, for each of a plurality of external applications 33, (i) information on the number of times that the each of the plurality of external applications 33 has been started up (hereinafter, referred to as "application start-up number") and (ii) information on the number of times that a function for which a warm-up is necessary has been carried out in a cooperation process carried out by the multifunction apparatus 1 and the each of the plurality of external applications 33 (hereinafter, referred to as "warm-up function execution number") in cooperation with each other.

The application start-up number and the warm-up function execution number, stored in the application information storage section 16, are updated by a device control section 10. That is, every time application identification information is selected by a user to carry out an external application 33 corresponding to the application identification information, the device control section 10 increases, by one (1), the application start-up number corresponding to the application identification information. Further, every time the device control section 10 receives a control command to execute a function for which the warm-up is necessary, the device control section 10 increases, by one (1), the warm-up function execution number corresponding to the application identification information, which application identification information indicates an external application 33 that is being in operation. The application start-up number and the warm-up function execution number are updated in this manner.

The device control section 10 works out a frequency of execution of a function for which the warm-up is necessary (a frequency of execution of the function for which the warm-up is necessary=the warm-up function execution number/the application start-up number). In a case where the frequency of the execution of the function for which the warm-up is necessary is not less than a predetermined threshold value (e.g., 50%), the device control section 10 starts the warm-up.

The following description deals with how the warm-up is carried out in a multifunction apparatus control system of the present embodiment. FIG. 11 is a flowchart showing how the warm-up is carried out in the multifunction apparatus control system of the present embodiment.

Figure 11:
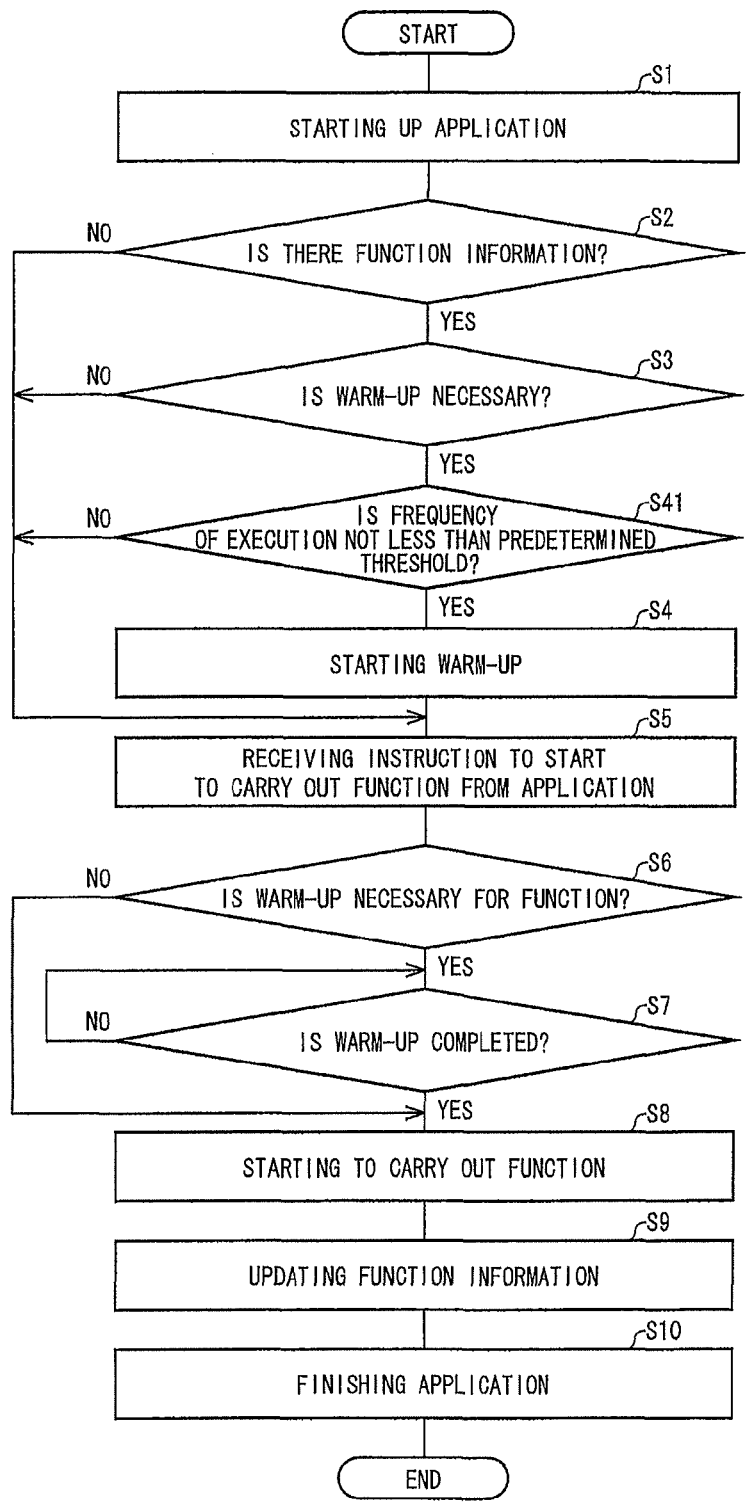
FIG. 11
FIG. 11 is a flowchart showing how a process is carried out in a multifunction apparatus control system in accordance with Embodiment 3 of the present invention.

Unlike a process shown in FIG. 3, the multifunction apparatus control system of the present embodiment carries out the step of S41 (see FIG. 11). Accordingly, the following description mainly deals with the step of S41.

According to the present embodiment, the device control section 10 determines whether or not selected function information indicates a function for which the warm-up is necessary (S3) (see FIG. 11). In a case where it is determined that the function information indicates the function for which the warm-up is necessary (Yes in S3), the device control section 10 carries out the step of S41 (see FIG. 11). In the step of S41, the device control section 10 reads out an application start-up number and a warm-up function execution number, each of which corresponds to the application identification information of an external application 33 that was started up in the step of S1. Then, the device control section 10 works out a frequency of execution of the function for which the warm-up is necessary by dividing the warm-up function execution number by the application start-up number. After that, the device control section 10 determines whether or not the frequency of execution of the function for which the warm-up is necessary is not less than a predetermined threshold value. In a case where the frequency is not less than the predetermined threshold value (Yes in S41), the device control section 10 starts the warm-up (S4). In a case where the frequency is less than the predetermined threshold value (No in S41), the device control section 10 does not start the warm-up.

With the arrangement, the warm-up would not be carried out for an external application having a low frequency of execution of the function for which the warm-up is necessary. This is because, even if the warm-up is carried out for the external application, the function for which the warm-up is necessary is not likely to be carried out. Accordingly, it becomes possible to have an increase in energy saving effect.

Note that, according to the present embodiment, in the step of S1, the device control section 10 increases, by one (1) at a time, the application start-up number corresponding to the application identification information selected by the user. Further, in a case where the step of S6 indicates "Yes", the device control section 10 increases, by one (1) at a time, the warm-up function execution number corresponding to the application identification information selected by the user in the step of S1.

In the above explanations, the application information storage section 16 stores the application start-up number and the warm-up function execution number. Note, however, that the present embodiment is not limited to this, and the application information storage section 16 can store frequency information indicating a frequency of execution of the function for which the warm-up is necessary (the warm-up function execution number/the application start-up number), instead of the application start-up number and the warm-up function execution number. In this case, the device control section 10 should determine, in the step of S41, whether or not the frequency of execution of the function for which the warm-up is necessary, indicated by the frequency information stored in the application information storage section 16, is not less than a predetermined threshold value.

MODIFIED EXAMPLES

A system of the present invention is not limited to the aforementioned Embodiments 1 through 3, and can be modified in various ways. The following description deals with modified examples of the present invention.

Modified Example 1

Depending on what content an external application 33 has, a time period from a time when the external application 33 is started up to a time when a function for which a warm-up is necessary is actually started varies. In a case where such a time period of an external application 33 is short, it is preferable to start the warm-up immediately after the external application 33 is started up (as in the aforementioned Embodiments 1 through 3). On the other hand, in a case where such a time period of an external application 33 is long, starting the warm-up immediately after the start-up of the external application 33 would cause a reduction in energy saving effect. On that account, timing when the warm-up is started can be set for each of the plurality of external application 33.

For example, the application information storage section 16 stores, for each of the plurality of external applications 33, start timing information indicating a time period from a time when the each of the plurality of external applications 33 is started up to a time when the warm-up is started. FIG. 12 is a view showing an example of an application information management table stored in the application information storage section 16. A user operates a multifunction apparatus 1 on the basis of information recommended by a creator of the each of the plurality of external applications 33 so that the start timing information is stored in the application information storage section 16. Alternatively, a certain external application 33 of the information processing apparatus 3 can (i) create a control command for updating start timing information corresponding to a registered address of the certain external application 33, and (ii) transmit the control command to the multifunction apparatus 1. Then, the device control section 10 can update the start timing information in accordance with the control command.

Figure 13:
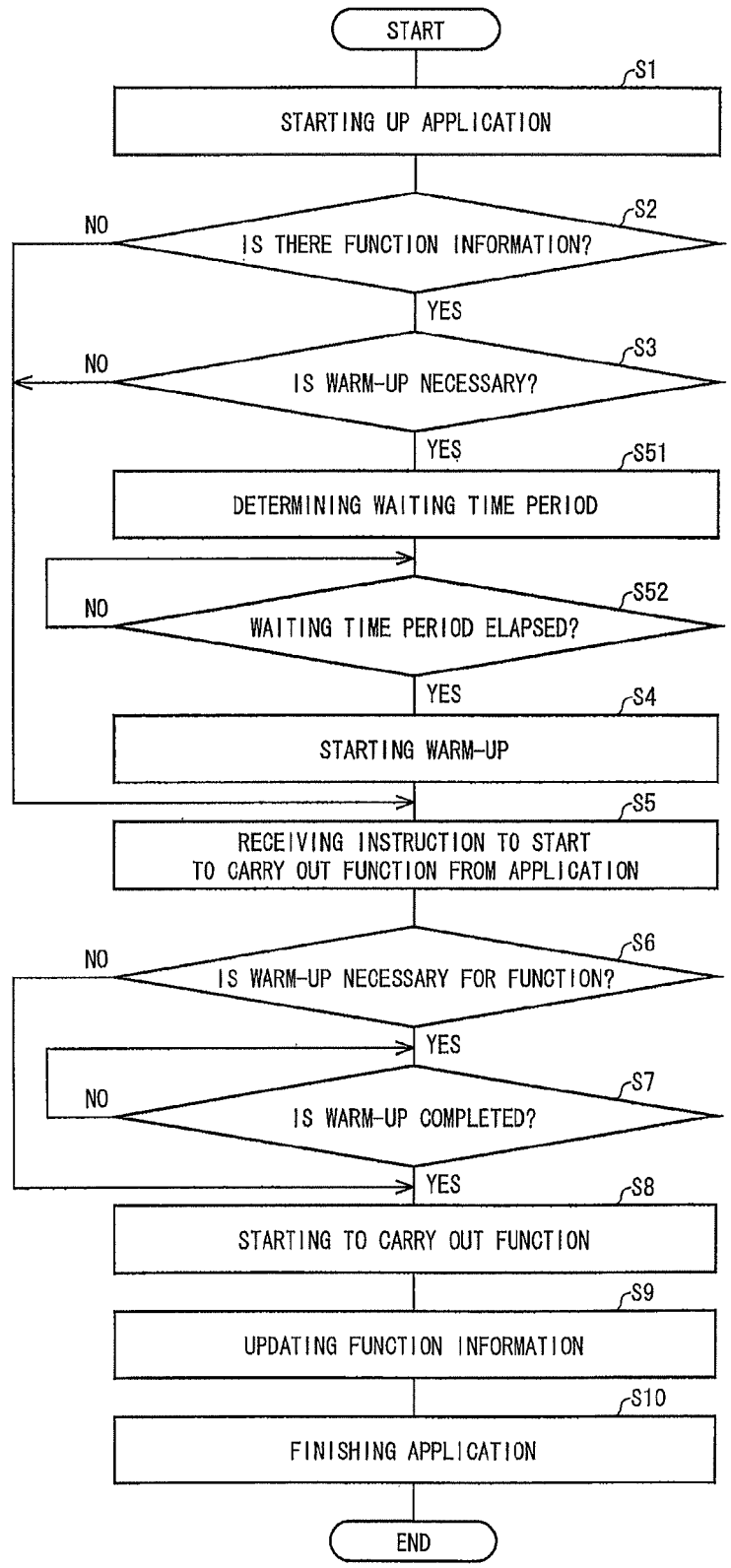
FIG. 13
FIG. 13 is a flowchart showing how a process is carried out in a multifunction apparatus control system in accordance with Modified Example 1 of the present invention.

FIG. 13 is a flowchart showing how a process is carried out in a system of the present modified example. After the step of S3, the device control section 10 (i) reads out, from the application information storage section 16, the start timing information corresponding to the application identification information selected by the user in the step of S1, and (ii) sets a time period indicated by the start timing information as a waiting time period (S51) (see FIG. 13). Then, the device control section 10 waits for the waiting time period (S52), and after that, starts carrying out the warm-up (S4). Note that the device control section 10 waits only for the warm-up, and does not wait to carry out other processes. For example, during the waiting time period, the device control section 10 can carry out other processes such as communications between a web browser section 15 and the information processing apparatus 3.

This makes it possible to start to carry out the warm-up at timing that is suitable for a target external application 33 among the plurality of external applications 33. Accordingly, it becomes possible to have an increase in energy saving effect.

Modified Example 2

Further, an application information storage section 16 can store, for each of a plurality of external applications 33, execution time period information indicating a time period from a time when the each of the plurality of external applications 33 is started up to a time when a device control section 10 receives a control command on which a function for which a warm-up is necessary is carried out (see FIG. 14), which time period was obtained from a previous cooperation process. The execution time period information can be updated by the device control section 10 in such a manner that (i) the device control section 10 stores (a) a time when the device control section 10 started up a web browser section 15 in the step of S1, and (b) a time when it was determined that the step of S6 indicates "Yes", and then (ii) the device control section 10 updates, in the step of S9, the execution time period information stored in the application information storage section 16 on the basis of a function start time that is a difference between the time (a) and the time (b). Note that, in the step of S9, the device control section 10 can store all of function start times obtained from previous cooperation processes, and cause the application information storage section 16 to store, as the execution time period information, an average value of all of the function start times. Note that the device control section 10 can cause the application information storage section 16 to store, as the execution time period information, only the latest function start time.

Then, in the step of S51 of FIG. 13, the device control section 10 can find a waiting time period by subtracting a predetermined time period from a time period indicated by the execution time period information. Here, the predetermined time period is set in advance as a time period that is necessary for the warm-up to be carried out.

This makes it possible to start, for each of the plurality of external applications 33, the warm-up at appropriate timing on the basis of records in previous cooperation processes carried out by the multifunction apparatus 1 and the each of the plurality of external applications 33 in cooperation with each other. Accordingly, it becomes possible to have an increase in energy saving effect.

Modified Example 3

In the aforementioned Embodiments, a warm-up is carried out in such a manner that a mode switching target member (here, an image forming section 13) is switched from a waiting mode to a normal operation mode. However, the present invention is not limited to this, and such a switching operation can be partially carried out in the step of S4.

For example, in addition to the waiting mode and the normal operation mode, the image forming section 13 can have at least one energy saving mode in which a surface of a fixing device, which surface is being contact with a toner, has a higher temperature than that of the waiting mode but lower than that of the normal operation mode. In other words, the energy saving mode consumes electric power more than the waiting mode but less than the normal operation mode. It is possible to switch, in the step of S4, the image forming section 13 from the waiting mode to any of such energy saving modes.

As explained in Embodiment 3, in a case of a multifunction external application 33 that can carry out various functions, a start-up of such a multifunction external application 33 does not always lead to execution of a function for which the warm-up is necessary. In view of this, it is possible to set, for each of a plurality of external applications 33, which mode the mode in operation is switched to. This makes it possible to, for example, (i) switch the mode in operation to the normal operation mode for an external application 33 which has a high frequency of execution of the function for which the warm-up is necessary, and (ii) switch the mode in operation to the energy saving mode for another external application 33 which has a low frequency of execution of the function for which the warm-up is necessary. This increases an energy saving effect.

FIG. 15 is a view showing an example of an application information management table managed by an application information storage section 16 of a multifunction apparatus 1. The application information storage section 16 stores, for each of the plurality of external applications 33, return destination mode information indicating a mode to which the mode in operation is returned (see FIG. 15). The return destination mode information is registered by a user on the basis of information recommended by a creator of that external applications 33. Alternatively, (i) the application information storage section 16 can store the number of times that the each of the plurality of external applications 33 has been started up and the number of times that the warm-up has been carried out for the each of the plurality of external applications 33 (see FIG. 10), and (ii) the device control section 10 can set, for each of the plurality of external applications 33, the return destination mode information in accordance with a frequency of execution of a function for which the warm-up is necessary. For example, the device control section 10 can (i) set, for an external application 33 whose frequency of execution of the function for which the warm-up is necessary is not less than 80%, the normal operation mode as the return destination mode information, and (ii) set, for an external application 33 whose frequency of execution of the function for which the warm-up is necessary is less than 80%, the energy saving mode as the return destination mode information. Further, in a case where the mode switching target member has two energy saving modes, namely, (i) a first energy saving mode and (ii) a second energy saving mode which consumes electric power more than the first energy saving mode, the return destination mode information can be set in the following manner. That is, for an external application 33 whose frequency of execution of the function for which the warm-up is necessary is in a range of not less than 50% but less than 80%, the device control section 10 (i) sets the second energy saving mode as the return destination mode information, and (ii) sets, for an external application 33 whose frequency of execution of the function for which the warm-up is necessary is less than 50%, the first energy saving mode as the return destination mode information.

Then, in the step of S4, the device control section 10 (i) reads out, from the application information storage section 16, the return destination mode information corresponding to the application identification information selected by the user in the step of S1, and then, (ii) starts carrying out the warm-up so as to switch the mode in operation to the mode indicated by the return destination mode information.

Modified Example 4

In the aforementioned Embodiments (including Modified Examples 1 through 3), an application information storage section 16 stores, as function information, information indicating what function(s), among a plurality of functions of a multifunction apparatus, has been carried out previously by the multifunction apparatus and a corresponding one of a plurality of external applications 33 in cooperation with each other. However, the present invention is not limited to this, and the application information storage section 16 can store, as the function information, information indicating whether or not there has been a function for which a warm-up is necessary, among a plurality of functions carried out previously in a cooperation process carried out by a multifunction apparatus 1 and a corresponding one of the plurality of external applications 33 in cooperation with each other. That is, the application information storage section 16 can store information indicating whether or not there has been a function that causes a mode switching target member (image forming section 13) to operate, among the plurality of functions previously carried out in the cooperation process carried out by the multifunction apparatus 1 and a corresponding one of the plurality of external applications 33 in cooperation with each other.

FIG. 16 is a view showing an example of an application information management table stored in the application information storage section 16 of the present modified example. As shown in FIG. 16, the application information storage section 16 stores "1" or "0" as the function information ("IN-FORMATION ON USED FUNCTION" shown in FIG. 16). The function information of "1" indicates that a function that causes the mode switching target member (image forming section 13) to operate has been previously carried out in a cooperation process carried out by the multifunction apparatus 1 and a corresponding one of the plurality of external applications 33 in cooperation with each other. The function information of "0" indicates that the function that causes the mode switching target member (image forming section 13) to operate has not been previously carried out in a cooperation process carried out by the multifunction apparatus 1 and a corresponding one of the plurality of external applications 33 in cooperation with each other.

According to the present modified example, when an instruction to register a new external application 33 to the application information management table is entered via an operational section 11, the device control section 10 registers, to the application information management table, application correspondence information in which application identification information, a registration address, and a function information indicating "0" are associated with each other. Further, in a case where an instruction to edit the application identification information or the registration address, which have been already registered in the application information management table, the device control section 10 changes, to "0", the function information of the target application correspondence information.

Further, the device control section 10 updates the function information in the step of S9 in the following manner. That is, the device control section 10 determines whether or not a function which is to be carried out on a control command received in the step of S5 is a function for which the warm-up is necessary. In a case where the control command is not a command to execute the function for which the warm-up is necessary, the device control section 10 does not update corresponding application correspondence information, and leaves the corresponding application correspondence information as it is. On the other hand, in a case where the control command is a command to execute the function for which the warm-up is necessary, the device control section 10 (i) does not change corresponding function information in a case where the function information, corresponding to the application identification information selected by the user in the step of S1, indicates "1", or (ii) updates the function information into "1" in a case where the function information indicates "0". This allows the application correspondence information stored in the application information management table to include the function information indicating weather or not the function for which the warm-up is necessary has been carried out previously in a cooperation process carried out by the multifunction apparatus 1 and a corresponding one of the plurality of external applications 33.

For example, in a case where no function or only a scanning function has been previously carried out in the cooperation process, "0" is stored as the function information. On the other hand, in a case where the printing function or the copying function has been previously carried out, "1" is stored as the function information.

In this case, instead of carrying out the steps of S2 and S3 shown in FIG. 3, the device control section 10 (i) finds, from the application information management table, the function information corresponding to the application identification information selected by the user, and (ii) determines whether or not the function information indicates that there has been the function for which the warm-up is necessary (in the above example, whether or not the function information indicates "1"). Then, in a case where the function information indicates that there has been the function for which the warm-up is necessary (in the above example, in the case where the function information indicates "1"), the device control section 10 can proceed to the step of S4.

<Others>

In the aforementioned Embodiments, an application information storage section 16 stores application correspondence information in which (i) application identification information for identifying an external application 33 and (ii) function information indicating what function(s) of a multifunction apparatus 1 has been previously carried out by the multifunction apparatus 1 and the external application 33 in cooperation with each other, are associated with each other. That is, the application information storage section 16 stores, as the function information, information indicating what function(s) has been carried out previously at least once.

However, the present invention is not limited to this, and the application information storage section 16 can store, as the function information, information indicating a type of a function that was carried out in the last cooperation process. In this case, in the step of S9, the function information can be updated in such a manner that information indicating the type of the function that was carried out in the step of S8 is stored as the function information.

Further, in the aforementioned Embodiment 2, an authentication server 2 is provided outside a multifunction apparatus 1*a* and an information processing apparatus 3. However, the authentication server 2 can be incorporated in the multifunction apparatus 1*a* or the information processing apparatus 3.

Further, in the aforementioned Embodiments, an image forming section 13 is used as a mode switching target member, as an example. However, the mode switching target member is not limited to the image forming section 13. For example, the mode switching target member having a normal operation mode and a waiting mode can be an image scanning section 12. The image scanning section 12 includes an exposure unit for scanning an image of a document. Light emitted from the exposure unit changes in accordance with an amount of a current. It is preferable that light is stably emitted in a constant amount. Since there is demand for a higher energy saving effect, it is preferable to supply electric power to the exposure unit only when the image scanning section 12 is used. However, a certain sort of a light source of the exposure unit takes a long time to start stably emitting its light in a constant amount since it started to receive electric power. In view of this, the image scanning section 12 can be provided switchable between a normal operation mode in which light can be emitted in a constant amount, and a waiting mode in which power consumption is lower than that of the normal operation mode. With the arrangement, the image scanning section 12 is in the waiting mode while the image scanning section 12 is not in operation. Immediately before the image scanning section 12 is started to operate, the warm-up for switching the image scanning section 12 from the waiting mode to the normal operation mode is carried out so that the image scanning section 12 becomes in the normal operation mode.

Note that in a case where there are two mode switching target members, such as the image scanning section 12 and the image forming section 13, the device control section 10 should determine, in the step of S3, whether or not the function information includes (i) information indicating a type of a function which causes the image scanning section 12 to operate (such as a scanning function or a copying function), and/or (ii) information indicating a type of a function which causes the image forming section 13 to operate (such as a printing function or the copying function). In a case where the function information includes the information indicating the type of the function which causes the image scanning section 12 to operate (such as the scanning function), the warm-up is started in the step of S4 so as to switch the image scanning section 12 from the waiting mode to the normal operation mode. Further, in a case where the function information includes the information indicating the type of the function which causes the image forming section 13 to operate (such as the printing function), the warm-up is started in the step of S4 so as to switch the image forming section 13 from the waiting mode to the normal operation mode. Furthermore, in a case where the function information includes the information indicating the type of the function which causes both the image scanning section 12 and the image forming section 13 to operate (such as the copying function), the warm-up is started in the step of S4 so as to (i) switch the image scanning section 12 from the waiting mode to the normal operation mode and (ii) switch the image forming section 13 from the waiting mode to the normal operation mode.

As described above, a multifunction apparatus of the present invention, which carries out a cooperation process in cooperation with an application selected from a plurality of applications which are executable on an external information processing apparatus, includes: a mode switching target member having (i) a normal operation mode and (ii) a waiting mode which is lower in power consumption than the normal operation mode, the mode switching target member being switchable between the normal operation mode and the waiting mode; an application information storage section in which application correspondence information is stored for each of the plurality of applications, the application correspondence information being such that (a) identification information for identifying the each of the plurality of applications and (b) function information indicating what function(s) has been carried out in a cooperation process carried out by the multifunction apparatus and the each of the plurality of applications, are associated with each other; and a control section for determining, in a case where the control section receives an instruction to start to carry out the cooperation process in cooperation with the application selected from the plurality of applications, whether or not a predetermined start condition is satisfied, the control section causing, in a case where it is determined that the predetermined start condition is satisfied, a switching operation or a part of the switching operation to be started, the switching operation switching the mode switching target member from the waiting mode to the normal operation mode, the predetermined start condition including at least the following Condition A.

Condition A: (1) function information, associated with identification information indicating the application selected from the plurality of applications, is found from the application information storage section, and (2) the function information found from the application information storage section indicates a specific function that causes the mode switching target member to operate.

Further, a multifunction apparatus of the present invention, which carries out a cooperation process in cooperation with an application selected from a plurality of applications which are executable on an external information processing apparatus, includes: a mode switching target member having (i) a normal operation mode and (ii) a waiting mode which is lower in power consumption than the normal operation mode, the mode switching target member being switchable between the normal operation mode and the waiting mode; an application information storage section in which application correspondence information is stored for each of the plurality of applications, the application correspondence information being such that (a) identification information for identifying the each of the plurality of applications and (b) function information indicating whether or not there has been a specific function which causes the mode switching target member to operate among a function(s) that has been carried out in a cooperation process carried out by the multifunction apparatus and the each of the plurality of applications, are associated with each other; and a control section for determining, in a case where the control section receives an instruction to start to carry out the cooperation process in cooperation with the application selected from the plurality of applications, whether or not a predetermined start condition is satisfied, the control section causing, in a case where it is determined that the predetermined start condition is satisfied, a switching operation or a part of the switching operation to be started, the switching operation switching the mode switching target member from the waiting mode to the normal operation mode, the predetermined start condition including at least the following Condition A.

Condition A: (1) function information, associated with identification information indicating the application selected from the plurality of applications, is found from the application information storage section, and (2) the function information found from the application information storage section indicates that there has been the specific function among the function(s) that has been carried out in the cooperation process.

According to the arrangement, in a case where the control section receives the instruction to start the cooperation process in cooperation with the application selected from the plurality of applications, the control section determines whether or not the specific function has been carried out in a previous cooperation process(es) carried out in cooperation with the application selected from the plurality of applications. In a case where it is determined that the specific function has been carried out in the cooperation process previously, the control section causes a switching operation or a part of the switching operation to be started, the switching operation switching the mode switching target member, which is used in the operation of the specific function, from the waiting mode to the normal operation mode. This makes it possible to start the switching operation for switching the mode switching target member from the waiting mode to the normal operation mode, or a part of the switching operation, before the control section receives the instruction to start carrying out the specific function. Accordingly, it becomes possible to reduce a user's waiting time period.

Furthermore, the multifunction apparatus of the present invention may further include an execution authority information storage section in which execution authority information is stored, the execution authority information indicating which function(s) a user who is being in a login state is allowed to use, the predetermined start condition further including the following Condition B.

Condition B: the execution authority information stored in the execution authority information storage section indicates that the user who is being in the login state is allowed to use the specific function.

According to the arrangement, in a case where the execution authority information indicates that the user who is being in the login state is allowed to use the specific function, the switching operation or a part of the switching operation is started, which switching operation switches the mode switching target member from the waiting mode to the normal operation mode. With the arrangement, in a case where the user who is being in the login state is not allowed to use the specific function, neither the switching operation nor a part of the switching operation is started. Therefore, it is possible to prevent unnecessary power consumption. Accordingly, it is possible to have an increase in energy saving effect.

Moreover, the multifunction apparatus of the present invention may be arranged such that the mode switching target member is an image forming section for forming an image on a recording sheet, and the multifunction apparatus further includes an output sheet number limiting information storage section in which output sheet number limiting information is stored, the output sheet number limiting information indicating the number of recording sheets which a user who is being in a login state is allowed to use by use of the specific function, the predetermined start condition further including the following Condition C.

Condition C: the number of recording sheets, indicated by the output sheet number limiting information stored in the output sheet number limiting information storage section, is not less than 1.

According to the arrangement, neither the switching operation nor a part of the switching operation is started, in a case where the number of sheets is 0, which number of sheets is indicated by the output sheet limiting information, corresponding to the user who is being in the login state. Therefore, it is possible to prevent unnecessary power consumption. Accordingly, it is possible to have an increase in energy saving effect.

Further, the multifunction apparatus of the present invention may be arranged such that the application information storage section stores, for each of the plurality of applications, one of (i) number-of-times information which indicates (a) the number of times that the each of the plurality of applications, indicated by the identification information, has been started up and (b) the number of times that the specific function has been previously carried out in the cooperation process carried out by the multifunction apparatus and the each of the plurality of applications, indicated by the identification information, and (ii) frequency information indicating a frequency obtained by dividing the number of times that the specific function has been carried out by the number of times that the each of the plurality of applications has been started up, so that the one of (i) the number-of-times information and (ii) the frequency information is associated with the identification information, the predetermined start condition further including the following Condition D.

Condition D: (1) one of number-of-times information and frequency information, corresponding to the identification information indicating the application selected from the plurality of applications, is found from the application information storage section, and (2) a frequency obtained by dividing the number of times that the specific function has been carried out, indicated by the number-of-times information found from the application information storage section, by the number of times that the application selected from the plurality of applications has been started up, indicated by the number-of-times information found from the application information storage section, is not less than a predetermined threshold value, or a frequency indicated by the frequency information found from the application information storage section is not less than the predetermined threshold value.

According to the arrangement, in a case where an application having a low frequency of execution of the specific function is selected, neither the switching operation nor a part of the switching operation is started. Therefore, it is possible to avoid such a situation that the switching operation or a part of the switching operation is started even in a case where the specific operation is not going to be carried out. This reduces the number of times that electric power is unnecessarily consumed. Accordingly, it is possible to have an increase in energy saving effect.

Furthermore, the multifunction apparatus of the present invention may be arranged such that the application information storage section further stores, for each of the plurality of applications, start timing information indicating such timing that the switching operation or a part of the switching operation is started, so that the start timing information and the identification information are associated with each other, the control section causing the switching operation or a part of the switching operation to be started in accordance with start timing information associated with the identification information indicating the application selected from the plurality of applications.

Some application has a long time period from a time when the application is started up to a time when execution of the specific function is started. Therefore, in a case where the switching operation or a part of the switching operation is started immediately after such an application is started up, electric power would be unnecessarily consumed. According to the arrangement, however, it is possible to set, for each of the plurality of applications, timing to start the switching operation or a part of the switching operation. Therefore, it is possible to prevent unnecessary power consumption. Accordingly, it is possible to have an increase in energy saving effect.

Moreover, the multifunction apparatus of the present invention may be arranged such that the application information storage section further stores, for each of the plurality of applications, execution time period information indicating a time period from a time when the each of the plurality of applications is started up to a time when the multifunction apparatus receives an instruction to carry out the specific function in the cooperation process carried out by the multifunction apparatus and the each of the plurality of applications, indicated by the identification information, so that the execution time period information and the identification information are associated with each other, the control section determining when to start the switching operation or a part of the switching operation on the basis of execution time period information associated with the identification information indicating the application selected from the plurality of applications.

According to the arrangement, it is possible to set, for each of the plurality of applications, timing to start the switching operation or a part of the switching operation, in accordance with the execution time period information obtained from a previous cooperation process(es) carried out by the multifunction apparatus and the application selected from the plurality of applications in cooperation with each other. Therefore, it is possible to start the switching operation or a part of the switching operation at appropriate timing. Accordingly, it is possible to prevent unnecessary power consumption.

Further, the multifunction apparatus of the present invention may be arranged such that the mode switching target member further has at least one energy saving mode which is higher than the waiting mode but lower than the normal operation mode in power consumption, the application information storage section further stores, for each of the plurality of applications, return destination mode information indicating one of the at least one energy saving mode and the normal operation mode, so that the identification information and the return destination mode information are associated with each other, and the control section carrying out the switching operation or a part of the switching operation by setting the mode switching target section to a mode indicated by the return destination mode information associated with the identification information.

As described above, some application has a long time period from a time when the application is started up to a time when execution of the specific function is started. Therefore, in a case where the switching operation or a part of the switching operation is started immediately after such an application is started up, electric power is unnecessarily consumed. According to the arrangement, however, it is possible to select, for each of the plurality of applications, the mode to which the mode switching target member is returned. Therefore, for example, for the application having a long time period from a time when the application is started up to a time when the execution of the specific function is started, it is possible to set, as the mode to which the mode switching target member is returned, not the normal operation mode but the energy saving mode. On the other hand, for example, for the application which has a low frequency of execution of the specific function, it is possible to set, as the mode to which the switching target member is returned, not the normal operation mode but the energy saving mode. Accordingly, it is possible to have an increase in energy saving effect.

Furthermore, the multifunction apparatus of the present invention preferably further includes an updating section for updating the application correspondence information stored in the application information storage section, the updating section deleting the function information associated with the identification information, in a case where the identification information is changed.

In a case where the function information is not changed when the identification information of the application correspondence information is changed, whether or not the switching operation or a part of the switching operation is started would be determined on the basis of the function information indicating the function carried out by the application indicated by old identification information. In this case, for example, if (i) the application indicated by the identification information that has not been changed is an application that uses the specific function, and (ii) the application indicated by the identification information that has been changed is an application that does not use the specific function, the switching operation or a part of the switching operation would be unnecessarily started, According to the arrangement, however, the function information is deleted when the identification information of the application correspondence information is changed. Therefore, it is possible to solve such a problem.

The present invention is not limited to the description of the embodiments above, but may be altered by a skilled person within the scope of the claims. An embodiment based on a proper combination of technical means disclosed in different embodiments is encompassed in the technical scope of the present invention.

Lastly, each of the blocks of the multifunction apparatuses 1 and 1a can be realized by a hardware logic or by software by use of a CPU as described below.

That is, each of the multifunction apparatuses 1 and 1a includes: the CPU (central processing unit) which executes an instruction of a control program realizing each of the functions described above; a ROM (read only memory) in which the program is stored; an RAM (random access memory) which develops the program; a storage device (storage medium), such as a memory, in which the program and various kinds of data are stored; and the like. Further, the object of the present invention can be achieved in the following manner: (1) a storage medium for computer-readably storing a program code (an execute form program, intermediate code program, or source program) of the device control section 10, which is software for implementing the aforementioned functions, is provided to each of the multifunction apparatuses 1 and 1a, and (ii) a computer (or a CPU or an MPU (Microprocessor Unit)) of each of the multifunction apparatuses 1 and 1a reads out the program code stored in the storage medium so as to execute the program.

Examples of the storage medium encompass: tapes, such as magnetic tapes and cassette tapes; disks including magnetic disks, such as floppy disks (registered trademark) and hard disks, and optical disks, such as CD-ROMs, MOs, MDs, DVDs, and CD-Rs; cards, such as IC cards (including memory cards) and optical cards; and semiconductor memories, such as mask ROMs, EPROMs, EEPROMs, and flash ROMs.

Further, each of the multifunction apparatuses 1 and 1a can be made connectable to a communication network, and the program code can be supplied via the communication network. The communication networks are not limited to specific means. Examples of the communication network encompass the Internet, an intranet, an extranet, a LAN, an ISDN, a VAN, a CATV communication network, a virtual private network, a telephone line network, a mobile communication network, a satellite communication network, and the like. Furthermore, a transmission medium constituting the communication network is not particularly limited. Specifically, it is possible to use a wired line such as a line in compliance with an IEEE 1394 standard, a USB line, a power line, a cable TV line, a telephone line, an ADSL line, and the like, as the transmission medium. Moreover, it is possible to use (i) a wireless line utilizing an infrared ray used in IrDA and a remote controller, (ii) a wireless line which is in compliance with a Bluetooth standard (registered trademark) or an IEEE802.11 wireless standard, and (iii) a wireless line utilizing an HDR, a mobile phone network, a satellite line, a terrestrial digital network, and the like, as the transmission medium. Note that, the present invention can be realized by a computer data signal which is realized by electronic transmission of the program code and which is embedded in a carrier wave.

Industrial Applicability

The present invention is suitably applicable to a multifunction apparatus that realizes a plurality of functions such as a copying function, a scanning function, and a facsimile sending/receiving function.

REFERENCE SIGNS LIST 1, 1a: Multifunction apparatus
2: Authentication server
3: Information processing apparatus
10: Device control section (control section, updating section)
11: Operational section
12: Image scanning section (mode switching target member)
13: Image forming section (mode switching target member)
16: Application information storage section
17: Login user information storage section (execution authority information storage section, output sheet number limiting information storage section)
31: External application section
32: External application storage section
33: External application
100: Multifunction apparatus control system

The invention claimed is:

1. A multifunction apparatus which carries out a cooperation process in cooperation with an application selected from a plurality of applications which are executable on an external information processing apparatus, comprising:
  a mode switching target member having (i) a normal operation mode and (ii) a waiting mode which is lower in power consumption than the normal operation mode, the mode switching target member being switchable between the normal operation mode and the waiting mode;
  an application information storage section in which application correspondence information is stored for each of the plurality of applications, the application correspondence information being such that (a) identification information for identifying the each of the plurality of applications and (b) function information indicating what function(s) has been carried out in a cooperation process carried out by the multifunction apparatus and the each of the plurality of applications, are associated with each other; and
  a control section for determining, in a case where the control section receives an instruction to start to carry out the cooperation process in cooperation with the application selected from the plurality of applications, whether or not a predetermined start condition is satisfied,
  the control section causing, in a case where it is determined that the predetermined start condition is satisfied, a switching operation or a part of the switching operation to be started, the switching operation switching the mode switching target member from the waiting mode to the normal operation mode,
  the predetermined start condition including at least the following Condition A,
  Condition A: (1) function information, associated with identification information indicating the application selected from the plurality of applications, is found from the application information storage section, and (2) the function information found from the application information storage section indicates a specific function that causes the mode switching target member to operate.

2. The multifunction apparatus as set forth in claim 1, further comprising:
  an execution authority information storage section in which execution authority information is stored, the execution authority information indicating which function(s) a user who is being in a login state is allowed to use,
  the predetermined start condition further including the following Condition B,
  Condition B: the execution authority information stored in the execution authority information storage section indicates that the user who is being in the login state is allowed to use the specific function.

3. The multifunction apparatus as set forth in claim 1, wherein:
  the mode switching target member is an image forming section for forming an image on a recording sheet,
  the multifunction apparatus further comprising:
  an output sheet number limiting information storage section in which output sheet number limiting information is stored, the output sheet number limiting information indicating the number of recording sheets which a user who is being in a login state is allowed to use by use of the specific function,
  the predetermined start condition further including the following Condition C,
  Condition C: the number of recording sheets, indicated by the output sheet number limiting information stored in the output sheet number limiting information storage section, is not less than 1.

4. The multifunction apparatus as set forth in claim 1, wherein:
  the application information storage section stores, for each of the plurality of applications, one of (i) number-of-times information which indicates (a) the number of times that the each of the plurality of applications, indicated by the identification information, has been started up and (b) the number of times that the specific function has been previously carried out in the cooperation process carried out by the multifunction apparatus and the each of the plurality of applications, indicated by the identification information, and (ii) frequency information indicating a frequency obtained by dividing the number of times that the specific function has been carried out by the number of times that the each of the plurality of applications has been started up, so that the one of (i) the number-of-times information and (ii) the frequency information is associated with the identification information,
  the predetermined start condition further including the following Condition D,
  Condition D: (1) one of number-of-times information and frequency information, corresponding to the identification information indicating the application selected from the plurality of applications, is found from the application information storage section, and (2) a frequency obtained by dividing the number of times that the specific function has been carried out, indicated by the number-of-times information found from the application information storage section, by the number of times that the application selected from the plurality of applications has been started up, indicated by the number-of-times information found from the application information storage section, is not less than a predetermined threshold value, or a frequency indicated by the frequency information found from the application information storage section is not less than the predetermined threshold value.

5. The multifunction apparatus as set forth in claim 1, wherein:
the application information storage section further stores, for each of the plurality of applications, start timing information indicating such timing that the switching operation or a part of the switching operation is started, so that the start timing information and the identification information are associated with each other, the control section causing the switching operation or a part of the switching operation to be started in accordance with start timing information associated with the identification information indicating the application selected from the plurality of applications.

6. The multifunction apparatus as set forth in claim 1, wherein:
the application information storage section further stores, for each of the plurality of applications, execution time period information indicating a time period from a time when the each of the plurality of applications is started up to a time when the multifunction apparatus receives an instruction to carry out the specific function in the cooperation process carried out by the multifunction apparatus and the each of the plurality of applications, indicated by the identification information, so that the execution time period information and the identification information are associated with each other,
the control section determining when to start the switching operation or a part of the switching operation on the basis of execution time period information associated with the identification information indicating the application selected from the plurality of applications.

7. The multifunction apparatus as set forth in claim 1, wherein:
the mode switching target member further has at least one energy saving mode which is higher than the waiting mode but lower than the normal operation mode in power consumption;
the application information storage section further stores, for each of the plurality of applications, return destination mode information indicating one of the at least one energy saving mode and the normal operation mode, so that the identification information and the return destination mode information are associated with each other; and
the control section carrying out the switching operation or a part of the switching operation by setting the mode switching target section to a mode indicated by the return destination mode information associated with the identification information.

8. The multifunction apparatus as set forth in claim 1, further comprising:
an updating section for updating the application correspondence information stored in the application information storage section,
the updating section deleting the function information associated with the identification information, in a case where the identification information is changed.

9. A multifunction apparatus which carries out a cooperation process in cooperation with an application selected from a plurality of applications which are executable on an external information processing apparatus, comprising:
a mode switching target member having (i) a normal operation mode and (ii) a waiting mode which is lower in power consumption than the normal operation mode, the mode switching target member being switchable between the normal operation mode and the waiting mode;
an application information storage section in which application correspondence information is stored for each of the plurality of applications, the application correspondence information being such that (a) identification information for identifying the each of the plurality of applications and (b) function information indicating whether or not there has been a specific function which causes the mode switching target member to operate among a function(s) that has been carried out in a cooperation process carried out by the multifunction apparatus and the each of the plurality of applications, are associated with each other; and
a control section for determining, in a case where the control section receives an instruction to start to carry out the cooperation process in cooperation with the application selected from the plurality of applications, whether or not a predetermined start condition is satisfied,
the control section causing, in a case where it is determined that the predetermined start condition is satisfied, a switching operation or a part of the switching operation to be started, the switching operation switching the mode switching target member from the waiting mode to the normal operation mode,
the predetermined start condition including at least the following Condition A,
Condition A: (1) function information, associated with identification information indicating the application selected from the plurality of applications, is found from the application information storage section, and (2) the function information found from the application information storage section indicates that there has been the specific function among the function(s) that has been carried out in the cooperation process.

10. The multifunction apparatus as set forth in claim 9, further comprising:
an execution authority information storage section in which execution authority information is stored, the execution authority information indicating which function(s) a user who is being in a login state is allowed to use,
the predetermined start condition further including the following Condition B,
Condition B: the execution authority information stored in the execution authority information storage section indicates that the user who is being in the login state is allowed to use the specific function.

11. The multifunction apparatus as set forth in claim 9, wherein:
the mode switching target member is an image forming section for forming an image on a recording sheet,
the multifunction apparatus further comprising:
an output sheet number limiting information storage section in which output sheet number limiting information is stored, the output sheet number limiting information indicating the number of recording sheets which a user who is being in a login state is allowed to use by use of the specific function,
the predetermined start condition further including the following Condition C, Condition C: the number of recording sheets, indicated by the output sheet number limiting information stored in the output sheet number limiting information storage section, is not less than 1.

12. The multifunction apparatus as set forth in claim 9, wherein:

the application information storage section stores, for each of the plurality of applications, one of (i) number-of-times information which indicates (a) the number of times that the each of the plurality of applications, indicated by the identification information, has been started up and (b) the number of times that the specific function has been previously carried out in the cooperation process carried out by the multifunction apparatus and the each of the plurality of applications, indicated by the identification information, and (ii) frequency information indicating a frequency obtained by dividing the number of times that the specific function has been carried out by the number of times that the each of the plurality of applications has been started up, so that the one of (i) the number-of-times information and (ii) the frequency information is associated with the identification information, the predetermined start condition further including the following Condition D, Condition D: (1) one of number-of-times information and frequency information, corresponding to the identification information indicating the application selected from the plurality of applications, is found from the application information storage section, and (2) a frequency obtained by dividing the number of times that the specific function has been carried out, indicated by the number-of-times information found from the application information storage section, by the number of times that the application selected from the plurality of applications has been started up, indicated by the number-of-times information found from the application information storage section, is not less than a predetermined threshold value, or a frequency indicated by the frequency information found from the application information storage section is not less than the predetermined threshold value.

13. The multifunction apparatus as set forth in claim 9, wherein:

the application information storage section further stores, for each of the plurality of applications, start timing information indicating such timing that the switching operation or a part of the switching operation is started, so that the start timing information and the identification information are associated with each other, the control section causing the switching operation or a part of the switching operation to be started in accordance with start timing information associated with the identification information indicating the application selected from the plurality of applications.

14. The multifunction apparatus as set forth in claim 9, wherein:

the application information storage section further stores, for each of the plurality of applications, execution time period information indicating a time period from a time when the each of the plurality of applications is started up to a time when the multifunction apparatus receives an instruction to carry out the specific function in the cooperation process carried out by the multifunction apparatus and the each of the plurality of applications, indicated by the identification information, so that the execution time period information and the identification information are associated with each other, the control section determining when to start the switching operation or a part of the switching operation on the basis of execution time period information associated with the identification information indicating the application selected from the plurality of applications.

15. The multifunction apparatus as set forth in claim 9, wherein:

the mode switching target member further has at least one energy saving mode which is higher than the waiting mode but lower than the normal operation mode in power consumption;

the application information storage section further stores, for each of the plurality of applications, return destination mode information indicating one of the at least one energy saving mode and the normal operation mode, so that the identification information and the return destination mode information are associated with each other; and the control section carrying out the switching operation or a part of the switching operation by setting the mode switching target section to a mode indicated by the return destination mode information associated with the identification information.

16. The multifunction apparatus as set forth in claim 9, further comprising:

an updating section for updating the application correspondence information stored in the application information storage section, the updating section deleting the function information associated with the identification information, in a case where the identification information is changed.

* * * * *